US010264211B2

(12) United States Patent
Leech et al.

(10) Patent No.: US 10,264,211 B2
(45) Date of Patent: Apr. 16, 2019

(54) ADAPTIVE RESOLUTION IN SOFTWARE APPLICATIONS BASED ON DYNAMIC EYE TRACKING

(71) Applicant: Comcast Cable Communications, LLC, Philadelphia, PA (US)

(72) Inventors: Jonathan Alan Leech, Denver, CO (US); Nicholas Adam Pinckernell, Littleton, CO (US); Edward David Monnerat, Highland Ranch, CO (US); Chris Robinson, Monument, CO (US); Derek Johnson, Sedalia, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 281 days.

(21) Appl. No.: 14/212,681

(22) Filed: Mar. 14, 2014

(65) Prior Publication Data
US 2015/0264299 A1    Sep. 17, 2015

(51) Int. Cl.
*H04N 7/01*    (2006.01)
*G06F 3/01*    (2006.01)
(Continued)

(52) U.S. Cl.
CPC .......... *H04N 7/0117* (2013.01); *G06F 3/013* (2013.01); *G06F 3/0304* (2013.01);
(Continued)

(58) Field of Classification Search
CPC .............................. G06F 3/013; G06F 3/0484
(Continued)

(56) References Cited

U.S. PATENT DOCUMENTS 8,878,773 B1 * 11/2014 Bozarth ............ G06K 9/00604
345/156
2002/0113782 A1    8/2002 Verberne et al.
(Continued)

FOREIGN PATENT DOCUMENTS

| CA | 2883560 | 3/2015 |
| EP | 15159055.1 | 3/2015 |
| GB | 2467898 A | 8/2010 |

OTHER PUBLICATIONS

Anonymous: "Enhanced TV Binary Interchange Format: Difference between revisions—Wikipedia, the free encyclopedia", Mar. 16, 2013 (Mar. 16, 2013), XP055198499, Retrieved from the Internet: URL:https://en.wikipedia.org/w/index.php.title?Enhanced_TV_Binary_Interchange_Format&diff=544688352&oldid=47033684.
(Continued)

*Primary Examiner* — Paulos M Natnael
(74) *Attorney, Agent, or Firm* — Banner & Witcoff, Ltd.

(57) ABSTRACT

Methods and systems are described for determining an image resource allocation for displaying content within a display area. An image or data capture device associated with a display device may capture an image of a space associated with the user or capture data related to other objects in the space. The viewing distance between the user and the display area (e.g., the display device) may be monitored and processed to determine and/or adjust the image resource allocation for content displayed within the display area. User movement, including eye movement, may also be monitored and processed to determine and/or adjust the image resource allocation for content displayed within the display area.

21 Claims, 12 Drawing Sheets

(51) Int. Cl.
*G06F 3/03* (2006.01)
*H04N 21/6587* (2011.01)
*H04N 19/17* (2014.01)
*H04N 19/115* (2014.01)
*H04N 19/137* (2014.01)
*H04N 19/162* (2014.01)
*H04N 21/2662* (2011.01)
*H04N 21/4223* (2011.01)
*H04N 21/442* (2011.01)
*G02B 27/00* (2006.01)

(52) U.S. Cl.
CPC ......... *H04N 19/115* (2014.11); *H04N 19/137* (2014.11); *H04N 19/162* (2014.11); *H04N 19/17* (2014.11); *H04N 21/2662* (2013.01); *H04N 21/4223* (2013.01); *H04N 21/44218* (2013.01); *H04N 21/6587* (2013.01); *G02B 27/0093* (2013.01); *G06F 2203/04805* (2013.01); *G06T 2207/10004* (2013.01); *G06T 2207/10028* (2013.01); *G06T 2207/30201* (2013.01)

(58) Field of Classification Search
USPC .................. 348/78, 576, 578, 51; 725/87
See application file for complete search history.

(56) References Cited

U.S. PATENT DOCUMENTS

| | | | | |
|---|---|---|---|---|
| 2003/0221192 A1* | 11/2003 | Rappaport | ............ | G06F 3/0482 725/41 |
| 2007/0094692 A1* | 4/2007 | de Heer | ............ | H04N 7/17318 725/87 |
| 2011/0141114 A1 | 6/2011 | Chen et al. | | |
| 2012/0105611 A1* | 5/2012 | Godar | ............ | H04N 13/0003 348/54 |
| 2012/0146891 A1 | 6/2012 | Kalinli | | |
| 2013/0125155 A1* | 5/2013 | Bhagavathy | ....... | H04N 21/2343 725/10 |
| 2013/0147686 A1* | 6/2013 | Clavin | ............ | G06F 3/013 345/8 |
| 2013/0155376 A1* | 6/2013 | Huang | ............ | A61B 3/024 351/224 |
| 2013/0156407 A1 | 6/2013 | Seok et al. | | |
| 2013/0219012 A1 | 8/2013 | Suresh et al. | | |
| 2013/0222270 A1* | 8/2013 | Winkler | ............ | H04M 1/0233 345/173 |
| 2013/0222271 A1* | 8/2013 | Alberth | ............ | G06F 1/163 345/173 |
| 2013/0265232 A1* | 10/2013 | Yun | ............ | G09G 3/3208 345/158 |
| 2013/0278631 A1* | 10/2013 | Border | ............ | G02B 27/017 345/633 |
| 2014/0007148 A1* | 1/2014 | Ratliff | ............ | H04N 21/251 725/12 |
| 2014/0085196 A1* | 3/2014 | Zucker | ............ | G06F 9/4443 345/156 |
| 2014/0253694 A1* | 9/2014 | Zustak | ............ | H04N 13/0018 348/51 |
| 2014/0313186 A1* | 10/2014 | Fahrer | ............ | B42D 3/00 345/418 |
| 2014/0356848 A1* | 12/2014 | Peterson | ............ | G06F 3/0482 434/428 |
| 2014/0361971 A1* | 12/2014 | Sala | ............ | G06F 3/041 345/156 |
| 2015/0082181 A1* | 3/2015 | Ames | ............ | G06F 3/04815 715/738 |
| 2015/0362588 A1* | 12/2015 | Ohmuro | ............ | G01S 7/497 356/5.04 |
| 2016/0018645 A1* | 1/2016 | Haddick | ............ | G02B 27/2228 345/8 |
| 2016/0062121 A1* | 3/2016 | Border | ............ | G02B 27/0172 359/630 |
| 2017/0045941 A1* | 2/2017 | Tokubo | ............ | G06F 3/013 |

OTHER PUBLICATIONS

European Extended Search Report—EP 15159055.1—dated Jul. 8, 2015.
Jun. 21, 2018—European Office Action—EP 15159055.1.
European Office Action—EP Appl. 15159055.1—dated Nov. 28, 2016.

\* cited by examiner

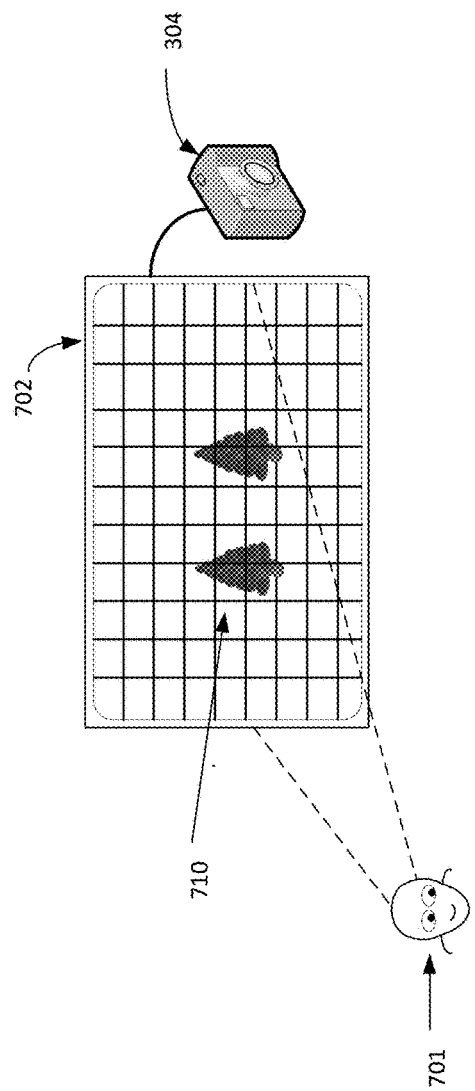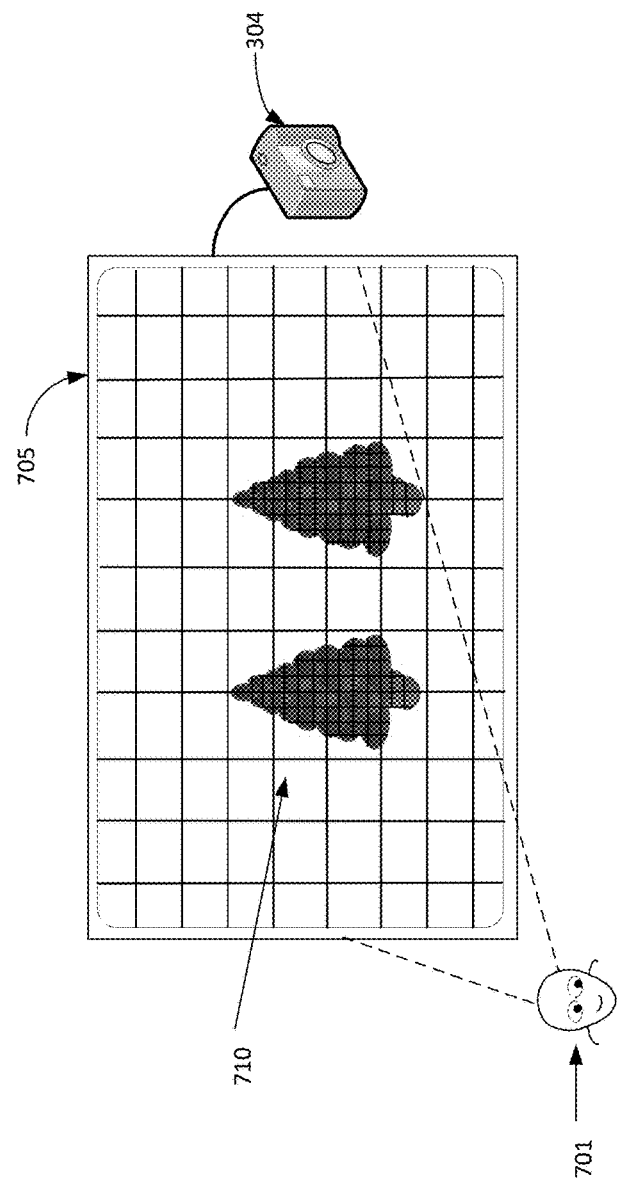

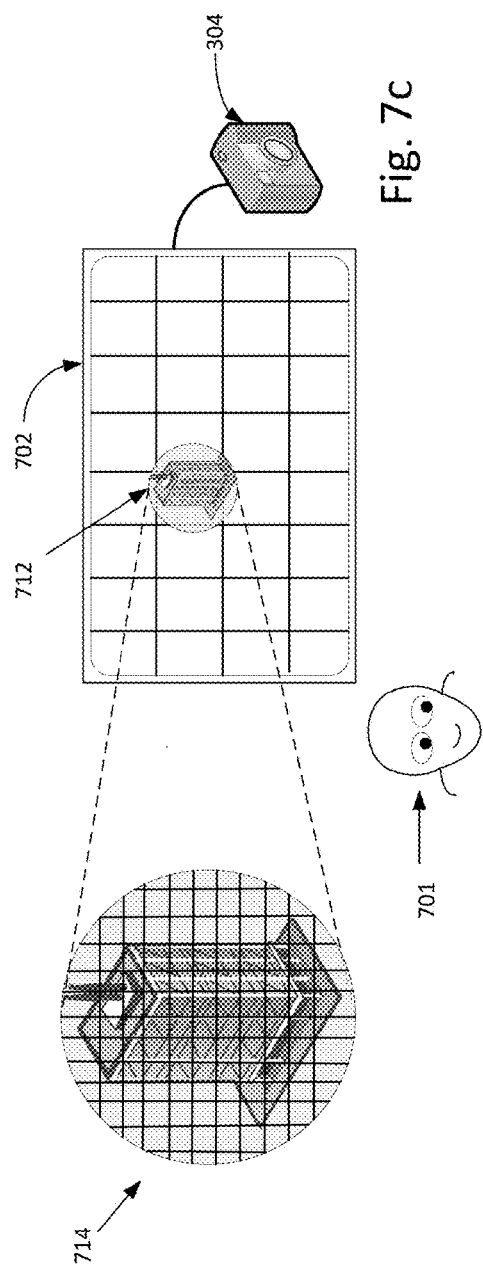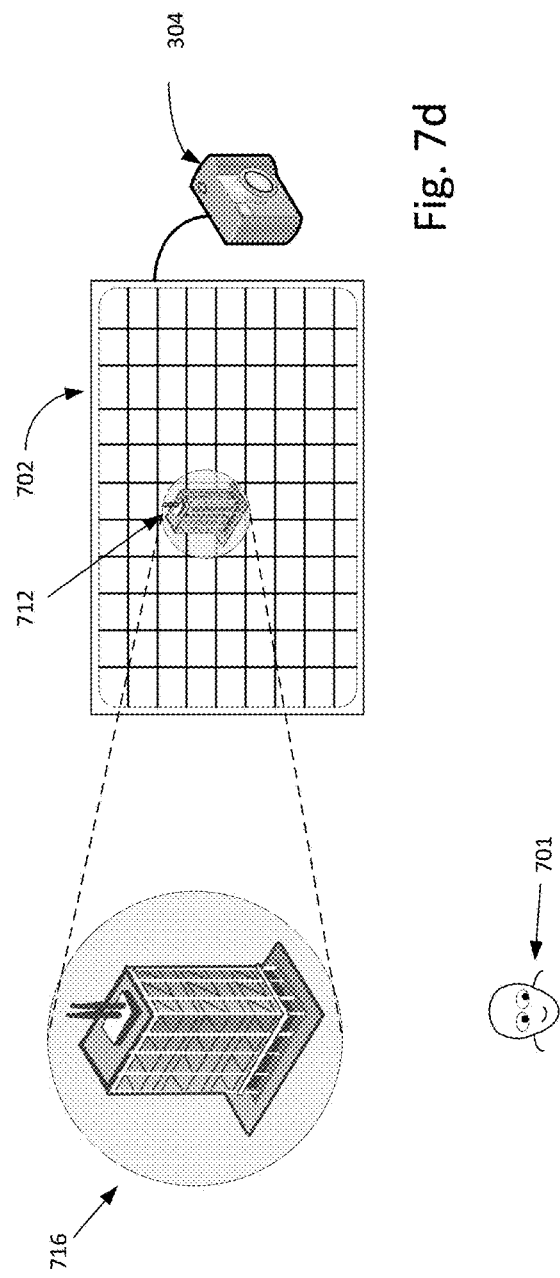

ADAPTIVE RESOLUTION IN SOFTWARE APPLICATIONS BASED ON DYNAMIC EYE TRACKING

BACKGROUND

Content providers transmit content to the consuming public in a variety of different formats and display resolutions (e.g., standard definition, high definition, etc.), all of which consume data transmission resources such as bandwidth. This bandwidth, however, is limited, and there remains an ever-present need for improved methods of most efficiently using the available bandwidth to achieve the most satisfaction among users. This disclosure relates to providing content to a user in a more efficient way.

SUMMARY

The following summary is for illustrative purposes only, and is not intended to limit or constrain the detailed description.

The disclosure is directed to systems and methods aimed at satisfying the need of delivering content to end users in an efficient manner, while still optimizing the user's viewing experience. In some embodiments, areas of the video image that are the focus of the viewer's eyes are transmitted with a higher resolution than other areas of the video image. This may optimize the usage of the limited transmission bandwidth (and other video resources) that is available, by reducing the level of resources used for less important areas of the video image. Some aspects of this disclosure relate to determining a viewing distance between a user and a display area, and determining an image resource allocation for displaying content within the display area based on the determined viewing distance. Further aspects of this disclosure relate to tracking a user's interaction with content displayed within a display area, such as by, e.g., determining which display region within the display area the user's eyes are focused, and adjusting the image resource allocation for displaying the content based this interaction.

In an exemplary embodiment of the present disclosure, this is achieved by associating an image capture device (e.g., a camera) with a display device or display area. The image capture device captures an image of a user accessing content and his/her surroundings, and one or more objects in the captured image may be recognized by the image capture device. In another aspect, the image capture device may be configured to track the movements of one or more users viewing the display area. The allocation of image resources for displaying the content on the display device is adjusted based on the updated location and viewing distance of the one or more users in the viewing area. In this way, notwithstanding the user's location in the viewing area, the allocation of image resources for the content being displayed may be tailored to maximize available data transmission resources (e.g., bandwidth) without detracting from the user's perceived viewing experience.

In yet another aspect, what is being viewed by the user's eyes may be determined, and the corresponding regions of the display area (e.g., the display device) that the user is viewing may be recognized. An image resource allocation for displaying content on the display device may be adjusted based on those regions of the display device where the user's eyes are focused. Content may be transmitted for display within the display area in accordance with the adjusted allocation of image resources. In this way, content is provided to the user in an efficient manner, e.g., maximizing the allocation of image resources, without detracting from the user's perceived viewing experience.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 7*a* and 7*b* illustrate one embodiment of transmitting content for display within a display area in accordance with the size of the display device.

FIGS. 7*c* and 7*d* illustrate one embodiment of transmitting content for display within a display area in accordance with the viewing distance of the user.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
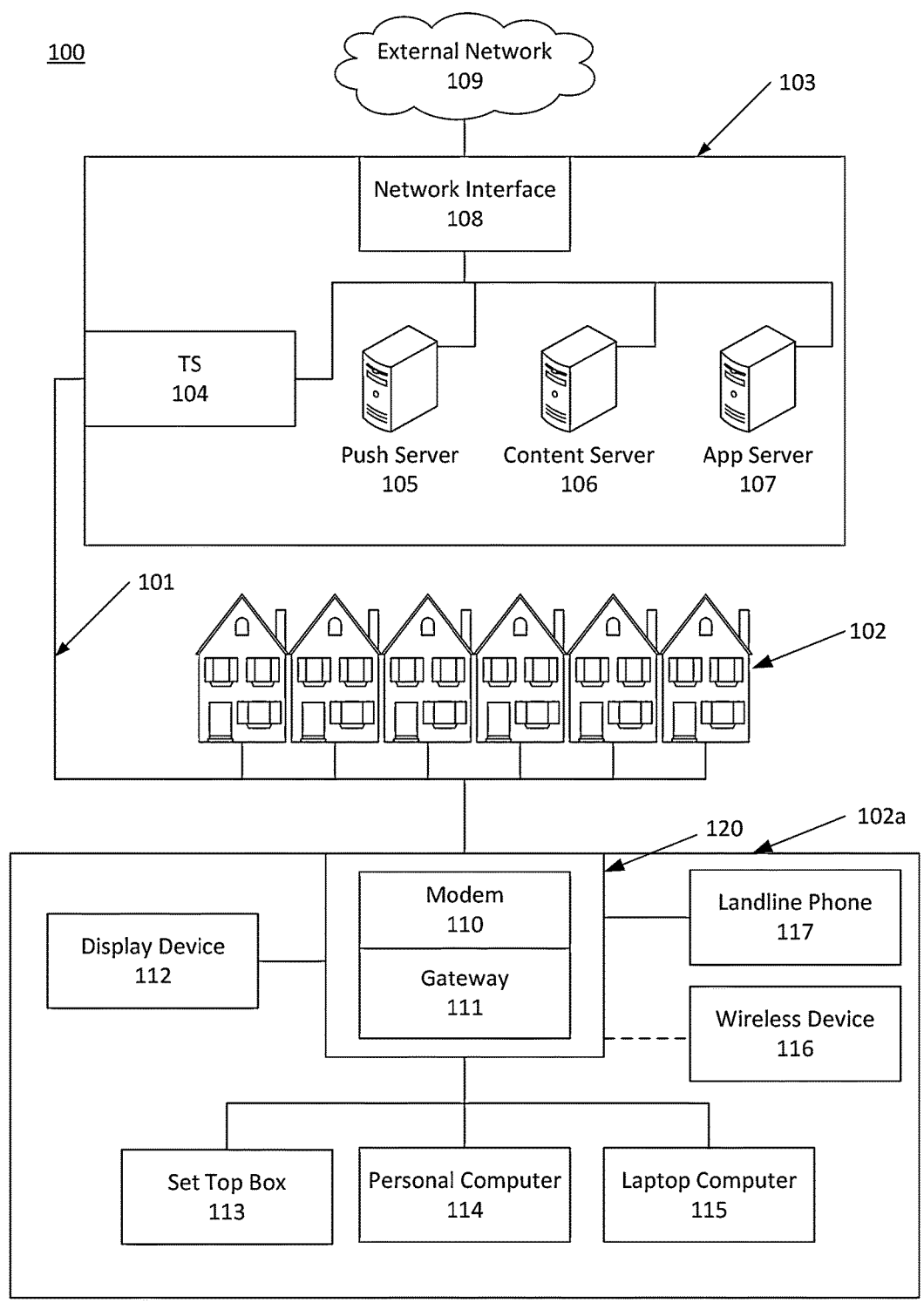
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway 111. The modem 110 may be connected to, or be a part of, gateway 111. Gateway 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The various devices in the system may be configured to determine and/or adjust an image resource allocation for displaying an image based on dynamic tracking of a user's movements. For example, gateway 111 may receive and process data from an image sensing or capturing device, such as a camera, to determine an image resource allocation for displaying content (e.g., video images) within a display area (e.g., display device 112) in accordance with a user's distance from the display area.

Figure 2:
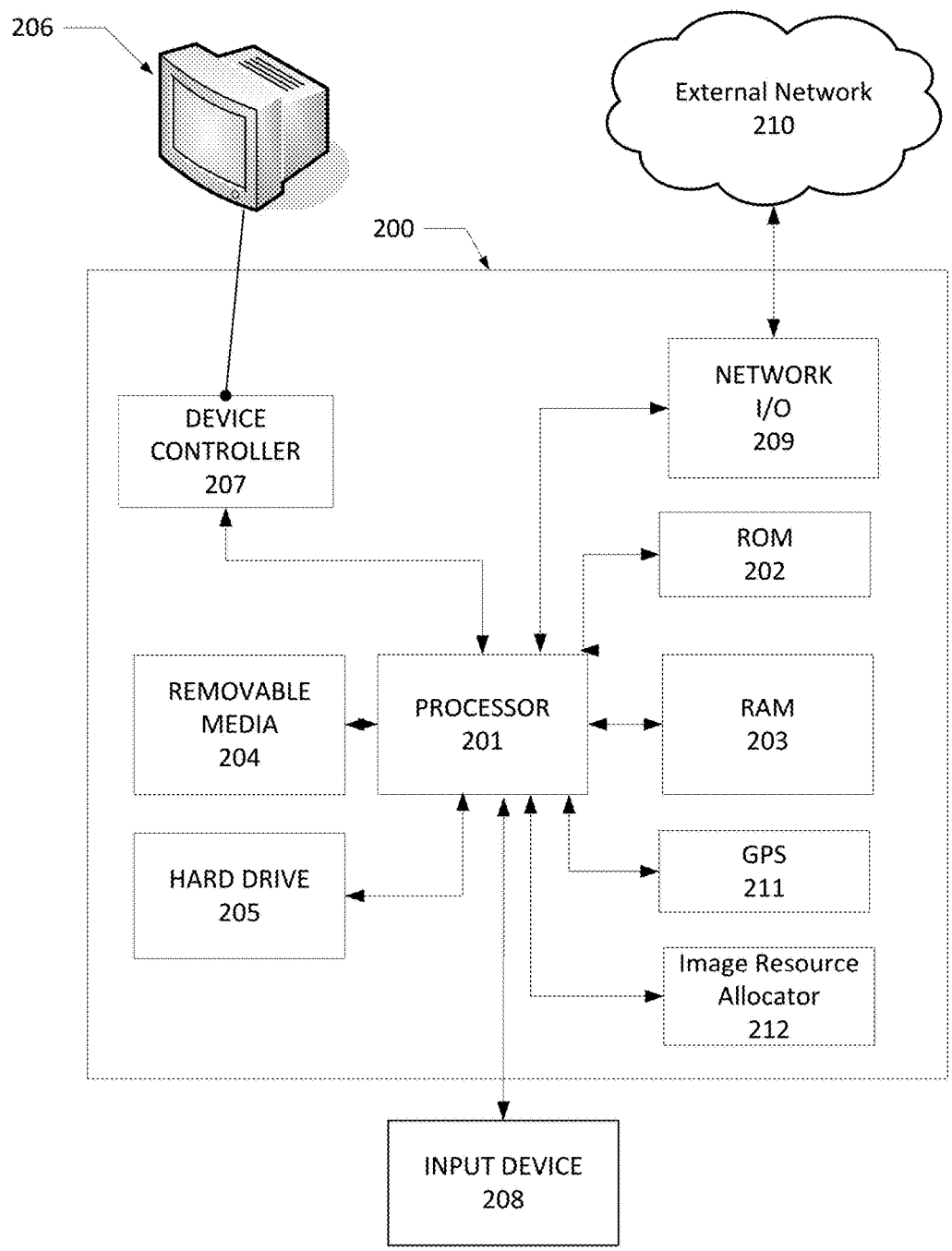
FIG. 2 illustrates an example computing device and software configuration that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device. FIG. 2 illustrates an image resource allocator 212 component, which may be a dedicated processor configured to perform the various image resource allocation functions described herein, or it may be implemented by the device's main processor 201.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
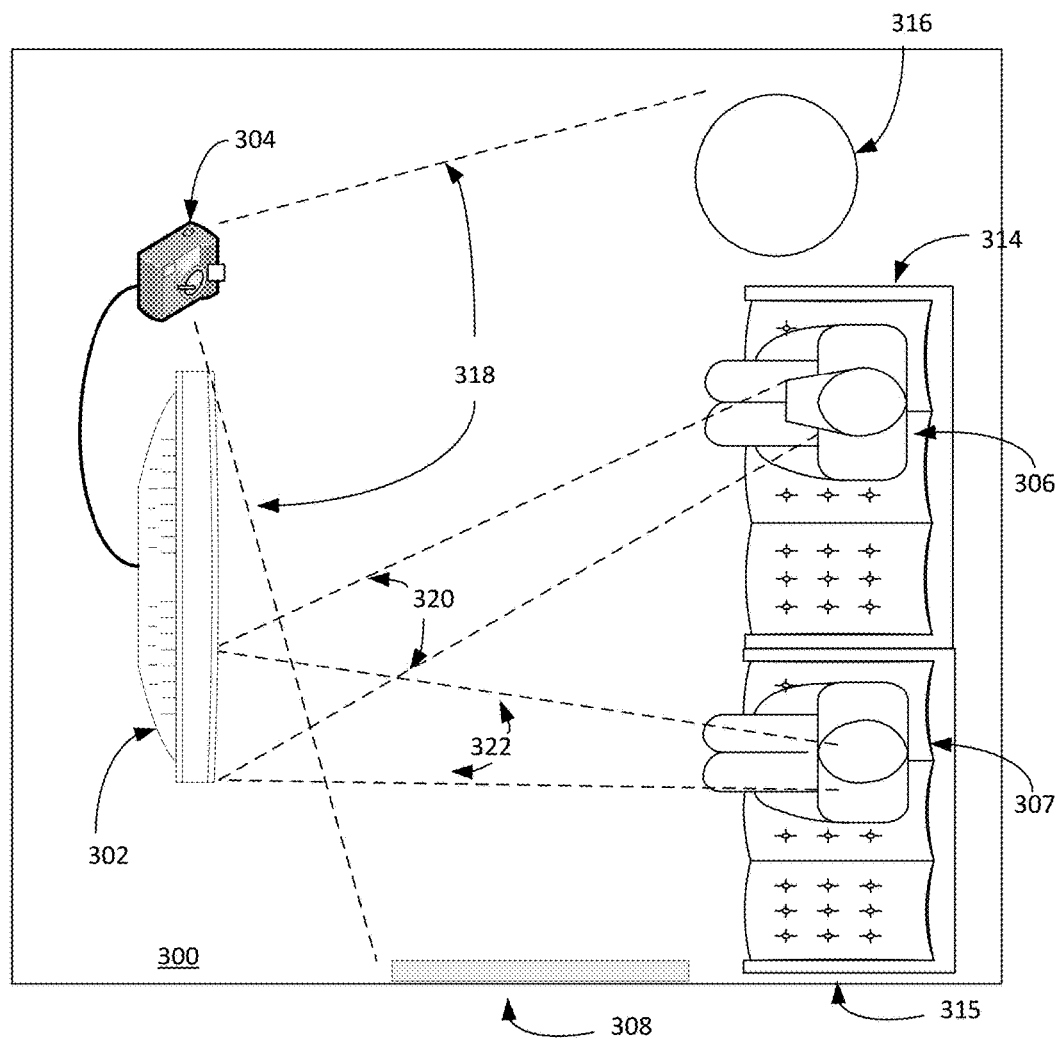
FIG. 3 illustrates a user's room as an example environment in which some embodiments of the present disclosure may be used.

FIG. 3 illustrates an example environment in which one embodiment of the disclosure may be employed. This example environment comprises a room 300 which may be, e.g., a room in a user's home. In other embodiments, the room 300 may be any space where the user may access or consume content. For example, the room 300 may be, e.g., the user's place of employment, a train, an airplane, a school, a church, etc. The room 300 includes a first user 306 and a second user 307 accessing content via a display device 302. For example, the first user 306 may be watching a television program on the display device 302. The display device 302 may be any device in the art suitable for displaying content as discussed above in reference to FIG. 1 including, but not limited to, a television, a video display, a computer monitor, a desktop computer, a laptop computer, a tablet computer, a smartphone, and the like. The term "display area" may be used herein to refer to an area of the display device or combination of display devices, and/or any other suitable surface where an image may be outputted, transmitted, or displayed. Additionally the term "display device" may be used herein to refer to a computing device (e.g., television) and/or the display screen associated with the display device (e.g., television screen). Such usage is merely for ease in discussing one or more of the embodiments disclosed herein, and should not be interpreted as limiting the exact embodiment in which the method described further below may be performed. As will be appreciated, the display area is not limited to the display screen of the display device. For example, a projector or other computing device may display a video image on a separate display screen or a wall within the room 300. In another example, a projector or other computing device may output a first portion of a video image on a display device or combination of display devices, and a second portion of the image on a surface (e.g., display screen or wall) surrounding and/or adjacent to the display device or combination of display devices. Although FIG. 3 depicts the display area as a single display device (i.e., the display device 302), the display area may span multiple display devices. For example, an image or video content may be displayed across a plurality display devices. The exact configuration of the display area can vary significantly without departing from the present disclosure.

In FIG. 3, the display device 302 is located across from the first user 306 sitting on a sofa 314, and the second user 307 sitting on a sofa 315. The room 300 also includes further exemplary items that may be found in and around the first user 306 and the second user 307 accessing content, including a table 316, and an image such as a picture frame 308. Again, each item is merely representative of objects which may be located around one or more users accessing content and is not intended to limit or define a typical environment for use of the present disclosure. The range and number of objects which may be around the first user 306 or the second user 307 in other settings is virtually limitless.

An image sensing or capturing device, such as a camera 304 may be associated with the display device 302. In FIG. 3, the camera 304 is depicted as sitting to the side of the display device 302, but the camera 304 may be located at any suitable location throughout the room 300 such that one or more users are in the field of view of the camera 304. For example, the camera 304 may be mounted on top of the display device 302. Further, in some embodiments, the camera 304 may be integral to the display device 302. For example, televisions, personal computers, laptop computers, tablet computers, smartphones, and others may contain cameras integrally formed within the display device. The exact location, configuration, and association of the camera 304 with the display device 302 can vary significantly without departing from the present disclosure. The camera 304 may be configured to capture a three-dimensional ("3D") image or 3D information of the users in the room 300. For example, the camera may be used to capture the depth of objects in the room to determine 3D structures or objects in space such as bodies or body parts. In other embodiments, the camera 304 may be configured to detect different wavelengths of light or electromagnetic radiation, for example, an infrared (IR) signal transmitted by a remote control device.

Broken lines 318 represent an exemplary field of view of the camera 304. In the illustrated example, the camera 304 is positioned such that the table 316, the sofas 314 and 315, the first user 306, the second user 307, and the frame 308 are all in its field of view. In various other embodiments, the camera 304 may be positioned in such a way that less than all of the items in the room 300 are in its field of view. For example, in one embodiment the camera 304 may be focused on the sofa 314, and thus the first user 306 and/or items situated on or around the sofa 314 may be in the camera's 304 field of view. In another embodiment the camera 304 may be focused on the sofa 315, and thus the second user 307 and/or items situated on or around the sofa 315 may be in the camera's 304 field of view. In yet another embodiment the camera 304 may be focused on the first user 306, and thus the first user 306 and/or items situated near the first the first user 306 may be in the camera's 304 field of view. In some embodiments, the camera 304 may be focused on multiple users within the room 300. For example, the camera 304 may be focused on the first user 306 and the second user 307, and thus the first user 306, the second user 307, and/or items situated near the first user 306 and the second user 307 may be in the camera's field of view. The image capture device (e.g., camera) 304 may be dynamically controllable by one or more computing devices. For example, one or more computing devices in this system may be configured to adjust the field of view of the camera 304. In other examples, the camera 304 may be programmed and/or configured to continuously scan the room 300. In some embodiments, the first user 306 or the second user 307 may physically change the location of the camera 304 within the room 300. In other embodiments, the first user 306 or the second user 307 may adjust the field of view of the camera 304. The location and configuration of the camera 304 may be further varied without departing from the scope of this disclosure.

Broken lines 320 represent an exemplary field of view of the first user 306, illustrating the direction in which the first user 306 is looking. While accessing content, the first user 306 may alter his or her field of view depending on, e.g., an object of interest appearing on the display device 302. As depicted by broken lines 320, in this example the first user 306 is directing his/her eye focus towards the left side of the display device 302. As will be appreciated with discussion of the following figures, the first user's 306 field of view is also focused towards the lower part of the display device.

That is, in this example, the first user 306 is directing his/her eye focus towards the lower, left side of the display device 302. Furthermore, broken lines 322 represent an exemplary field of view of the second user 307. While viewing content on the display device 302, the second user 307 may also alter his or her field of view. As depicted by broken lines 322, in this example the second user 307 is also directing his/her eye focus towards the left side of the display device 302. In this example, although the first user 306 and the second user 307 are directing their respective eye focus to the same area of display device 302, as will be appreciated with discussion of the following figures, the second user's 307 field of view may differ from the first user's 306 field of view. For example, the first user 306 may direct his/her eye focus the lower right side of the display device 302, while the second user 307 may direct his or her eye focus towards the upper left side of the display device 302.

Figure 4:
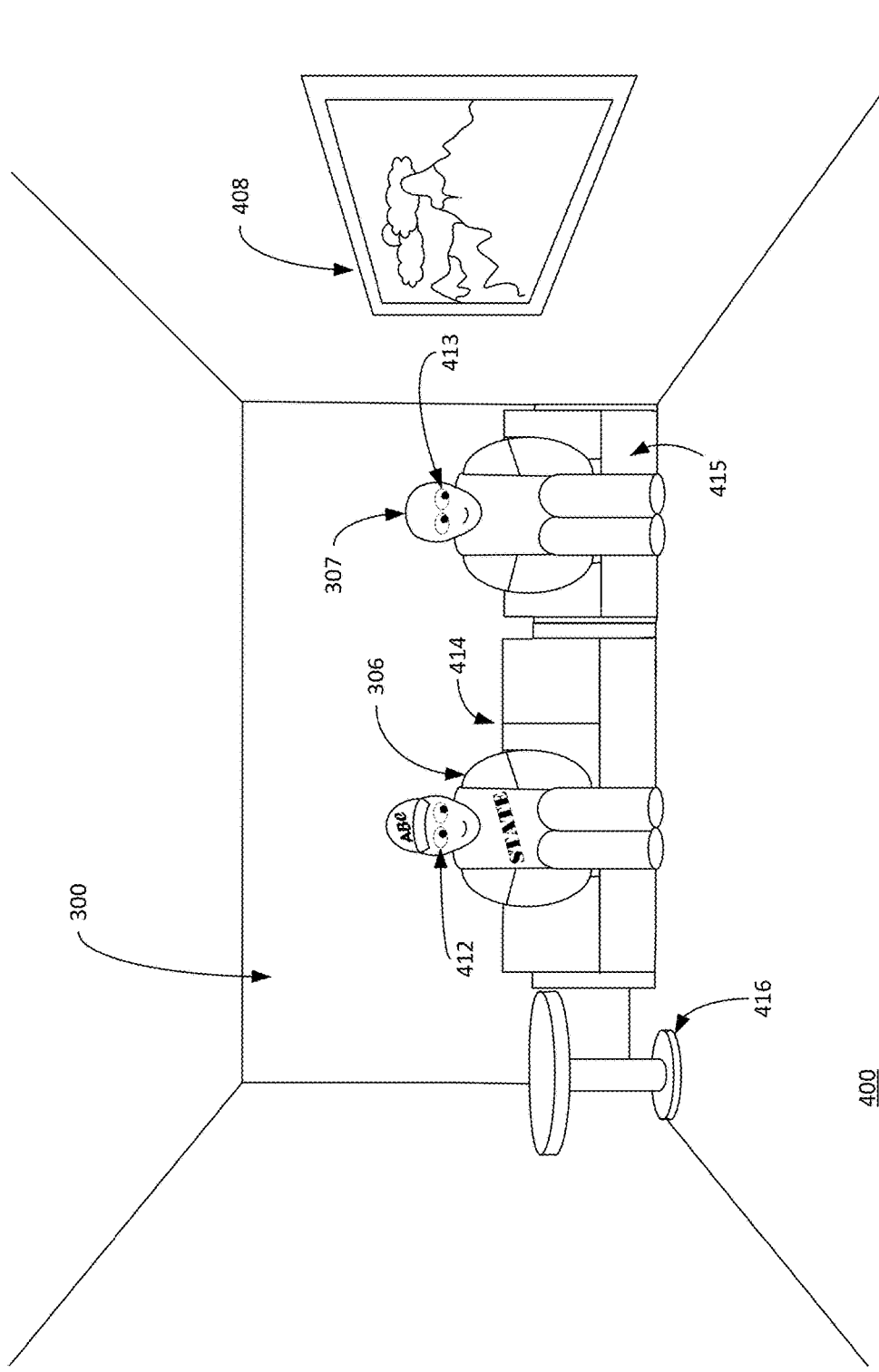
FIG. 4 illustrates an example captured image of the room depicted in FIG. 3.

FIG. 4 illustrates an exemplary captured image 400 by the camera 304 according to one embodiment of the disclosure. Specifically, the captured image 400 is representative of an image that the camera 304 may capture having a field of view illustrated by broken lines 318. In this embodiment, the captured image 400 is a perspective view of the room 300 and each of its components that appear within broken lines 318. Specifically, the captured image 400 includes a perspective view of the first user 306 and the second user 307. In some embodiments, captured image 400 may include one or more objects. As used herein, "object" refers broadly to any identifiable item, article, piece of furniture, and the like residing within the room. For example, in this embodiment, captured image contains a table object 416 (i.e., the table residing in the room 300); a sofa object 414 (i.e., the sofa where the first user 306 is sitting); a sofa object 415 (i.e., the sofa where user 307 is sitting); and a frame object 408 (i.e., the frame hanging from the wall in the room 300). An image capture device (e.g., the camera 304) or other data capture device may also recognize the first user's 306 eye focus, and more specifically, what is being viewed within the display area (e.g., the display device 302) by the eyes 412 of the first user 306 as will be discussed more fully below. Moreover, the camera 304 or other data capture device may also recognize user's 307 eye focus, and more specifically, what is being viewed on the display device 302 by the eyes 413 of the second user 307.

As discussed above, the first user's 306 eye focus is generally fixed down and towards the left side of the display device 302. That is, as seen in the perspective view of the first user 306, the first user's eyes 412 appear to be gazing down and towards the right side of captured image 400 (corresponding to the left side of the display device 302). As will become evident with respect to the discussion of other figures below, the first user's eyes 412 are thus an indication that the first user's 306 eye focus is directed towards the lower, left side of the display device 302. Likewise, as seen in the perspective view of the second user 307, the second user's eyes 413 appear to be gazing down and towards the right side of the captured image 400 (corresponding to the left side of the display device 302). Thus, an indication that the second user's 307 eye focus is directed towards the lower, left side of the display device 302.

Figure 5:
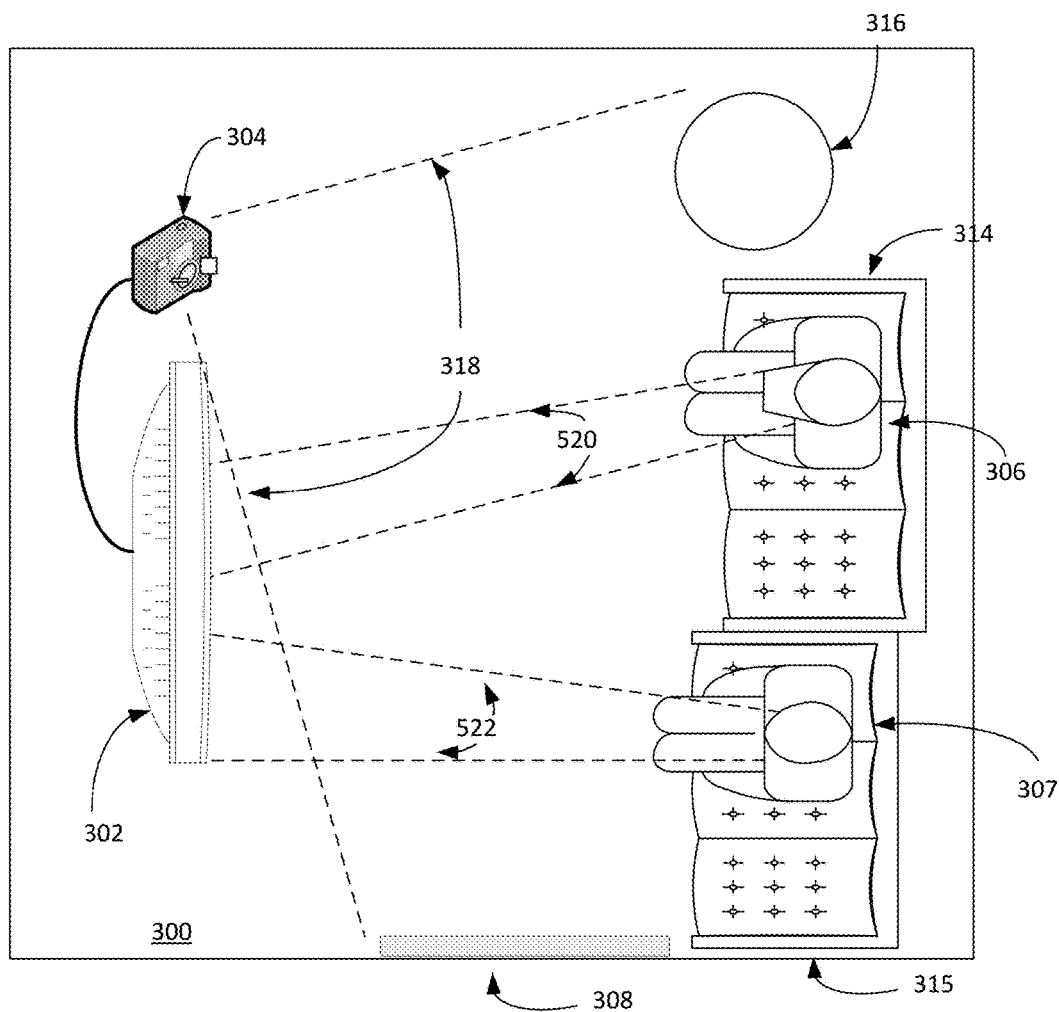
FIG. 5 illustrates a user's room as an example environment in which some embodiments of the present disclosure may be used.

Moving to FIG. 5, similar to FIG. 3, this example environment comprises the room 300, that includes the first user 306, the second user 307, the sofas 314 and 315, the table 316 and the frame 308. The field of view for the first user 306 in FIG. 5 differs from that in FIG. 3. As depicted by broken lines 520, in this example, the first user 306 is directing his/her eye focus towards the right side of the display area (e.g., the display device 302). As will be appreciated with discussion of the following figures, user's 306 field of view is also focused towards the center part of the display area. That is, in this example, the first user 306 is directing his/her eye focus towards the center, right side of the display device 302. Furthermore, broken lines 522 represent an exemplary field of view of the second user 307. Like in the previous example (i.e., FIG. 3), the second user 307 is still focusing his or her eye focus towards the lower, left side of the display device 302.

Figure 6:
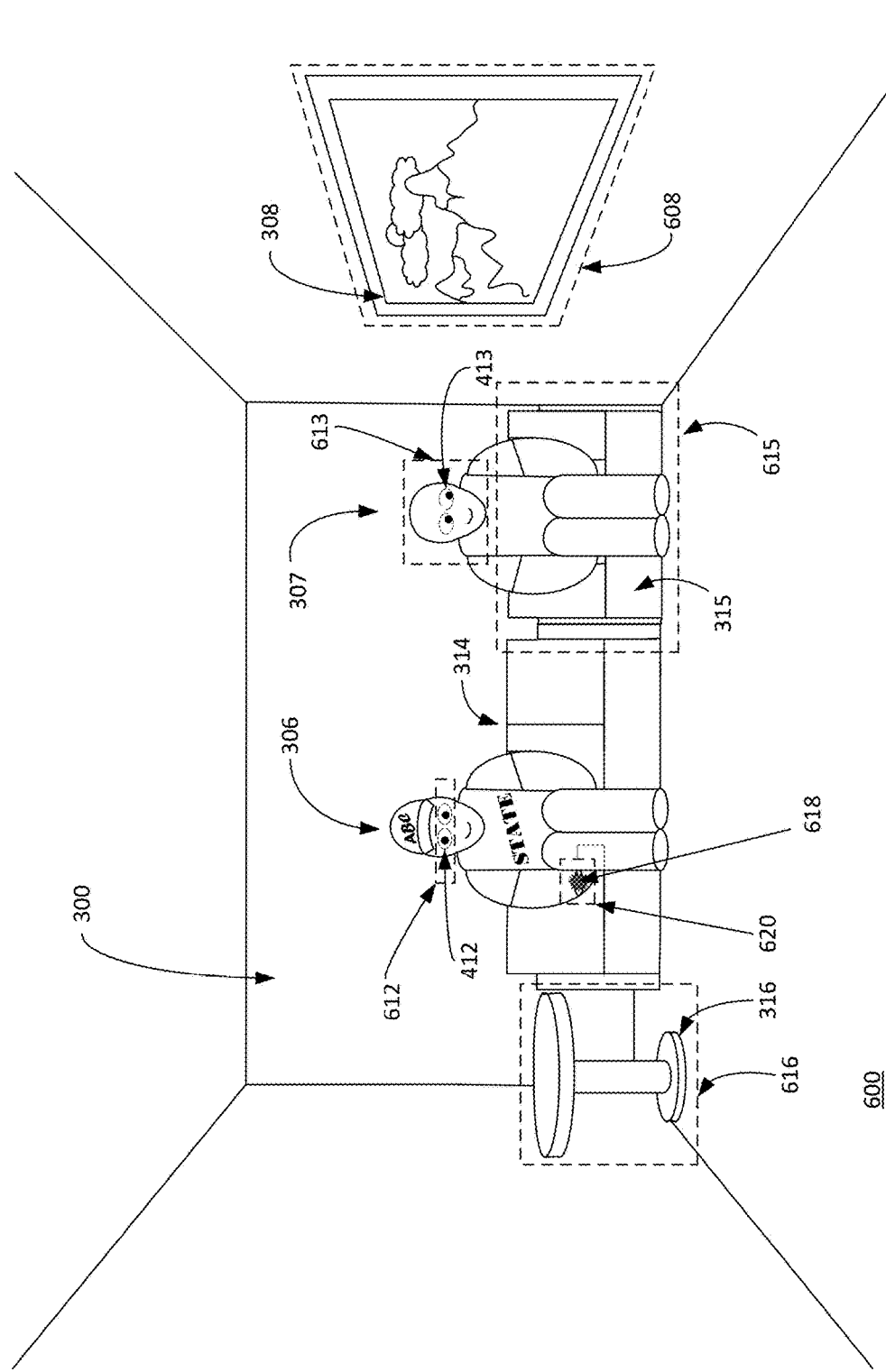
FIG. 6 illustrates an example captured image of the room depicted in FIG. 5.

FIG. 6 illustrates an exemplary captured image 600 by the camera 304 according to one embodiment of the disclosure. Specifically, the captured image 600 is representative of an image that the camera 304 may capture having a field of view illustrated by broken lines 318. In this embodiment, the captured image 600 is a perspective view of the room 300 and each of its components which appear within broken lines 318. Specifically, the captured image 600 includes a perspective view of the first user 306 and the second user 307. In some embodiments, the captured image 600 may include one or more objects. Again, each object presented in FIG. 6 is for illustrative purposes only. In other embodiments, users accessing content on a display device may have any number of objects on or around them that may appear in a captured image, such as the captured image 600. Objects may be recognized by comparing the detected image with predefined images of known objects, articles, pieces of furniture, etc. using any desired image-matching technique. Additionally, objects may be recognized as fitting the basic shape of a known type of object. In this example, broken lines 616 depict the recognition by image sensing device (e.g., the camera 304) of the table 316 in the captured image 600. In other embodiments, the camera 304 may detect different wavelengths of light or electromagnetic radiation. In this example, broken lines 620 depict the recognition by image sensing device (e.g., the camera 304) of a remote control signal 618 that is illustrated as a flash of light in FIG. 6.

Broken lines 608, 612, 613, 615, and 616 are representations of one embodiment of the present disclosure recognizing objects and/or users in the captured image 600. Specifically, broken lines 608 represent recognition of the frame 308, broken lines 615 represent recognition of the sofa 315, and broken lines 616 represent recognition of the table 316. Moreover, in this example, broken lines 612 represent recognition of the first user's eyes 412, and broken lines 613 represent recognition of the second user's 307 face. Any desired image-matching and recognition technique may be used to recognize the objects in the room or the users' eyes. In one embodiment, such techniques may be used to, e.g., recognize an object or other item in the captured image 600 (e.g., recognize a table). In other embodiments, these techniques may be used to, e.g., recognize features of the users (e.g., facial recognition and/or recognize the first user's eyes 412 or the second user's eyes 413).

Merely by way of example, recognition may be performed by a processor operatively coupled to memory containing application software well known in the art as suitable for object recognition. A processor and/or memory for performing such a task may be integral to the display device 302 and/or the camera 304 or may be remote from each component (at, e.g., a centralized server). This application software may perform various recognition tasks to, e.g., the captured image 400 and/or the captured image 600 in order to recognize objects therein. In one embodiment, the application software may comprise a database of exemplary objects and a processor may thus compare, e.g., the captured image 600 to the database of exemplary objects. If the captured image 600, or any aspect of the captured image 600 (e.g., a specific item, article or piece of furniture, etc.) is similar to an exemplary image, the processor running the application software may recognize the captured image 600 and/or specific aspects of the captured image 600 as being the same as the exemplary object.

In other embodiments, the application software may comprise a database of images previously captured by the camera 304 and the processor may thus compare, e.g., the captured image 600 to a recently captured image in the database of images. If the captured image 600, or any aspect of the captured image 600 (e.g., the location of the first user 306, the location of the second user's eyes 413, etc.) differs from a recently captured image, the processor running the application software may recognize that specific aspects of the composition of the room have changed. For example, in the captured image 600, the first user's 306 eye focus is generally centered and fixed towards the right side of the display area (e.g., the display device 302). That is, as seen in the perspective view of the first user 306, the first user's eyes 412 appear to be gazing towards the left side of the captured image 600 (corresponding to the right side of the display device 302). Likewise, as seen in the perspective view of the second user 307, the second user's eyes 413 appear to be gazing down and towards the right side of captured image 400 (corresponding to the left side of the display device 302). Thus an indication that the second user's 307 eye focus is directed towards the lower, left side of the display device 302.

By comparing the captured image 400 to the captured image 600, the processor may determine that the first user's eyes 412 have shifted from gazing down and to the right in the captured image 400, to gazing slightly left and toward the center in the captured image 600. Accordingly, the processor may be configured to determine that user's 306 eye focus has changed during the time period that the captured image 400 and the captured image 600 were taken by the camera 304. In some embodiments, a computing device, such as the processor, or any other computing devices operatively coupled to a processor 804 (e.g., the camera 304) may be configured to determine whether one of the user's eyes is focused on the display area (e.g., display device) when processing data relating to a user's eyes focus. This may occur for several reasons, such as the user only has one eye, the user has a medical condition (e.g., Strabismus), etc.

As another example, by way of comparing multiple captured images, the application software may recognize that a user has entered and/or is exited a door within the room. This method of object recognition is merely illustrative of one method of recognizing objects in a captured image, and is not intended to define or limit the object recognition process of the present disclosure. Of course, those skilled in the art will appreciate various other methods and hardware/software combinations that are suitable for recognizing objects within a captured image. Any number of these suitable methods for object recognition may be employed herein without departing from the present disclosure.

As is well known in the art, the native resolution of a display device represents the number of distinct pixels in each dimension that can be displayed on the display device. For example, a "1024×768" pixel screen of a display device is capable of displaying 1024 distinct pixels horizontally across the width of the display device and 768 pixels vertically along the height of the display device, or approximately 786,000 pixels total. Consequently, in this example, an image displayed on this display device will comprise a mosaic of 786,000 pixels. The human visual system has a fixed capacity to detect or perceive image quality. Several factors can affect a user's capacity to recognize detail or visually perceive an image displayed on a display device, including, but not limited to, the size of the display device, viewing distance, the transmission rate of the image(s), and resolution of the image(s) or content being displayed.

FIGS. 7a-7d depict illustrated examples of how these various factors may affect a user's perception of image quality based on the images outputted for display within a display area (e.g., display device). With regards to the size of a display area, keeping viewing distance and native resolution constant, as the size of the display area increases, the overall quality of the image being displayed to the user may decrease as the image is resized and appears increasingly pixilated, as the user can more clearly perceive the individual pixels of the image displayed within the display area. Conversely, keeping viewing distance and native resolution constant, as the size of the display area decreases, the overall quality of the image being displayed to the user may increase as the image appears less pixilated, and the likelihood of the user visually perceiving the individual pixels of the image displayed within the display area decreases.

By way of example, this principle is illustrated in FIGS. 7a-7b. In FIG. 7a, a display device 702 is displaying a content 710 (in this example, an image of two trees) to a user 701. In FIG. 7b, the content 710 is being displayed to the user 701 via a display device 705. In this example, the size of the display device 702 is smaller than the size of the display device 705 illustrated in FIG. 7b; however, the native resolution for display devices 702 and 705 are the same. When the content 710 is displayed on the display device 704, the visual appearance of the content 710 as displayed on the display device 705 is larger, more pixilated, and likely to be visually perceived by the user 701 as having a lower image quality due to the resizing that must occur.

Similarly, with regards to the factor of viewing distance, when viewing content within a display area from an appropriate distance, the pixels may blend together to create an image that is visually perceived by the user as complete and smooth. However, keeping the size and native resolution of the display area (e.g., display device) constant, as the distance between the user and the display area decreases, a point may be reached where pixilation occurs and the appearance of individual pixels can be perceived by the user. When this occurs, the perceived quality of the displayed image decreases and any advantages of moving closer to the display area produce less desirable effects for the user consuming content displayed within the display area. Conversely, as the distance between the user and the display area increases, a point may be reached where limitations in the human visual system may prevent the user from recognizing detailed aspects of the displayed image. When this occurs, the perceived quality of the displayed image may decrease and any advantages of moving further away from the display area produce less desirable effects for the user consuming content displayed within the display area.

By way of example, this principle is illustrated in FIGS. 7c-7d. In FIG. 7c, the display device 702 is displaying a content 712 (in this example, an image of a building) to the user 701. Specifically, FIG. 7c depicts the user 701 viewing the display device 702 at a close viewing distance. In FIG. 7d, the user 701 is viewing the content 712 on the display device 702 from a farther viewing distance. As discussed above, FIG. 7c illustrates the principle that as the user 701 views the display device 702 at a close viewing distance the appearance of individual pixels are more perceptible by the user 701, as illustrated by an image 714. Thus the advantages of moving closer to the display device 702 produce less desirable effects as visually perceived by the user 701. By contrast, in FIG. 7d, the user 701 is viewing the display device 702 from a farther viewing distance (a viewing distance greater than the example illustrated in FIG. 7c), thus lowering the probability that the content 712 displayed on the display device 702 appears pixilated or distorted to the user 701 (as illustrated by an image 716) and increasing the perceived image quality of the content 712 to the user 701.

Figure 8A:
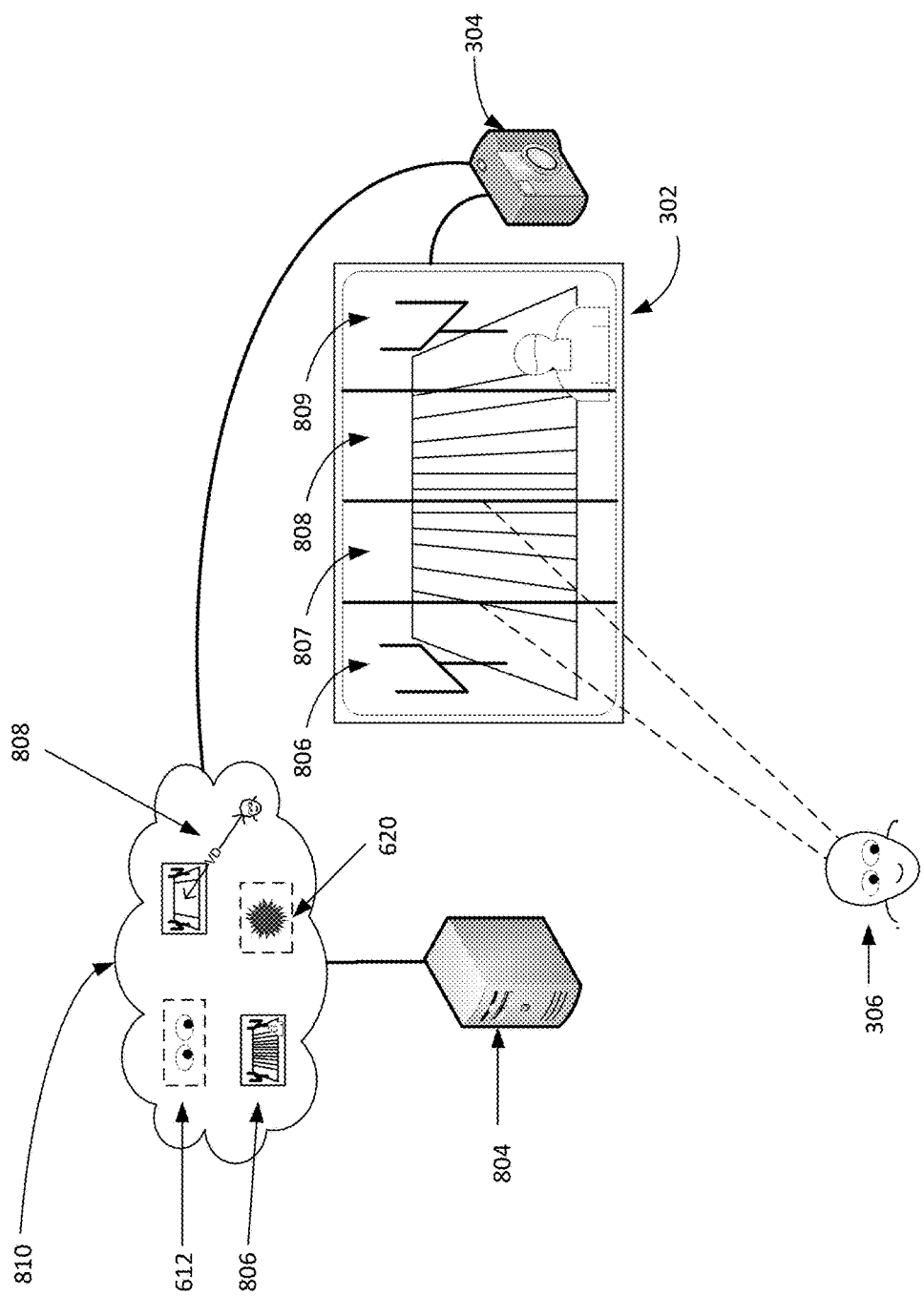
FIG. 8*a* illustrates one embodiment of transmitting content for display within a display area in accordance with a determined image resource allocation.
Figure 8B:
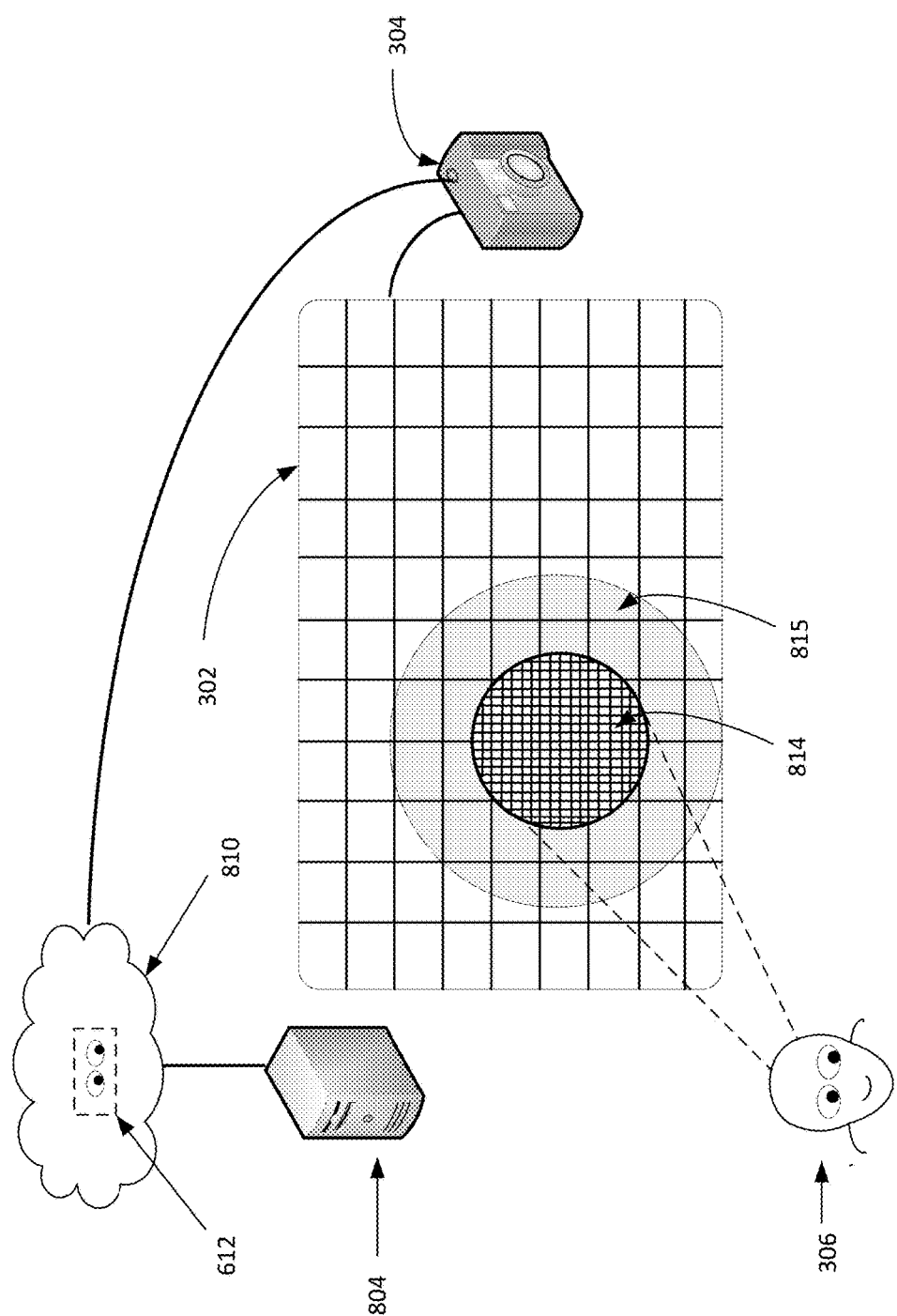
FIG. 8*b* illustrates another embodiment of transmitting content for display within a display area in accordance with a determined image resource allocation.

FIGS. 8a-8c illustrate embodiments of determining and adjusting an image resource allocation for displaying content within a display area. Specifically, FIG. 8a depicts example content that may be displayed to the first user 306 within a display area (e.g., the display device 302) associated with the camera 304. By way of example, in FIG. 8a, content consisting of a video presentation of a sporting event is displayed on the display device 302. In this embodiment the display device 302 may be, e.g., a television set, desktop computer, laptop computer, tablet computer, or smartphone or any other desired display area (e.g., the display device 702), displaying media content via fiber, coaxial cable, wireless, or other transmission media. Further, the camera 304 may be integral to the display device 302, or may be located externally to the display device 302 and operatively coupled to the display device by any method well known in the art.

FIGS. 8a-8b illustrate a first embodiment of adjusting image resource allocations within a display area (e.g., the display device 302) according to one aspect of the disclosure. In FIG. 8a, the display device 302 is displaying content (in this example, a football game). Specifically, the viewing distance between the first user 306 and the display device 302 is processed by the processor 804, as illustrated by element 808 in a processing cloud 810. The processing clouds used throughout the disclosure are for illustrative purposes only and are not intended to limit or define the manner in which information is processed.

The processor 804 may be a processor integral to the camera 304 and/or the display device 302. Alternatively, the processor 804 may be a processor located in another of a user's devices which are operatively coupled to or otherwise communicatively linked to the camera 304 and the display device 302. For example, the processor 804 may be located in a desktop computer, laptop computer, tablet computer, smartphone, video projector and the like operatively coupled to the camera 304. Alternatively, the processor 804 may be located remotely from the display device 302 and the camera 304. For example, the processor 804 may be located at a centralized server. Referring back to FIG. 1, in one embodiment the processor 804 may be located at a server in the local office 103. In this embodiment, the display device 302 and the camera 304 may be communicatively linked to the local office 103 through, e.g., links 101. In another embodiment, the processor 804 may be located at the push notification server 105, the content server 106, and/or the application server 107. In other embodiments, the processor 804 may be located at the gateway 111. The processor 804 may take a variety of forms in a variety of locations without departing from the disclosure. For example, referring to FIG. 2, in one embodiment, the processor 804 may be located at the image resource allocator 212.

Returning to FIG. 8a, in one embodiment, the camera 304 may be configured to capture an image of the room where the first user 306 is viewing content within a display area (e.g., the display device 302), for example, the captured image 400 and the captured image 600 illustrated in FIGS. 4 and 6. As discussed above, the processor 804 may be configured to process data relating to an image captured by the camera 304 to determine a user's viewing distance and detect structures or objects such as bodies, faces, body parts, furniture, etc. The processor 804 may also be configured to recognize the depth of objects in a room (e.g., the user's distance from the display area). A computing device, such as the processor 804, may also be configured to recognize the distance between a user and/or object and the display area. For example, the processor 804 may be configured to determine the distance between a user and a display area (e.g., display device) by processing information relating to the viewing distance of one or more objects in the room 300, such as the sofa 314, where the user was previously located. There are a variety of ways in which the processor 804 may determine a user's location within a room or the user's viewing distance from the display area. In one embodiment, the processor 804 may be configured to receive information relating to the viewing distance of a user from the camera 304, or one or more computing devices operatively coupled to the camera 304. In one embodiment, a computing device, such as the processor 804, may be configured to determine a user's viewing distance from the display device 302 based on the distance of one or more objects to the display device 302. In another embodiment, the processor 804 may be configured to determine a user's viewing distance by identifying the distance of an object within a predetermined distance from the first user. For example, the processor 804 may be configured to determine a user's viewing distance by identifying the distance of the object closest to the user and the display device 302.

In another embodiment, a computing device, such as the processor 804, may be configured to determine a user's viewing distance by processing data relating to the inter-pupillary distance of a user viewing the display device. In some embodiments a user may calibrate the system to ensure a more accurate calculation based on inter-pupillary distance. In one embodiment, the processor 804 may be configured to store in memory data relating to one or more users' viewing distance in a user profile.

As will be appreciated by one of skill in the art, the functionality of the system may be combined with various technologies known in the art (e.g., Bluetooth, Wi-Fi, RF devices) so as to determine a user's distance from the display area (e.g., display device) in various embodiments. For example, the processor 804 may be configured to determine a user's viewing distance by processing data relating to a remote control signal transmitted from a remote control device. In other embodiments, the camera 304 may be configured to detect a remote control signal 618 from a remote control device. In one of these embodiments, the camera may be configured to transmit information relating to the detection of the remote control signal 618 to one or more computing devices, such as the processor 804. In another of these embodiments, one or more computing devices, such as the gateway 111, may be configured to detect the remote control signal 618 and subsequently transmit data to the processor 804 relating to the detection of the remote control signal 618.

In some embodiments, a user may have the option of calibrating a determined viewing distance based on the detection of a remote control signal. For example, the user may be prompted to transmit a remote control signal from various distances within the room 300 in order to assist the calibration of the correct viewing distance of the user. In another embodiment, the processor 804 may be configured to receive data from one or more computer devices relating to a user's viewing distance from the display device. For example, one or more Bluetooth enabled computing devices, such as a cell-phone or laptop, may be configured to communicate with the display device and determine the user's viewing distance from the display device. In this example, the one or more computer devices, (e.g., cell-phone or laptop), may be configured to transmit data relating to the user's viewing distance to the processor 804, or any other computing devices operatively coupled to the processor 804.

As discussed above, the camera 304 may be configured to detect the depth of objects in the room, including the viewing distance of one or more users or objects in a room. In one embodiment, the camera 304 may be configured to locate a user within the room 300 by processing data relating to previous user locations within the room 300. For example, the camera 304 may be configured to locate a user within the room 300 by processing data stored in one or more user profiles. In some embodiments, the camera 304 may be configured to transmit to one or more computing devices data relating to a user's viewing distance from the display area (e.g., the display device). For example, the camera 304 may be configured to transmit to the processor 804 data relating to the user's viewing distance. The processor 804 may also be configured to store in memory data relating to the viewing distance of one or more users viewing the display device. In other embodiments, the camera 304 may be configured to transmit to one or more computing devices data relating to the distance of a recognized object in the room 300. For example, the camera 304 may be configured to transmit to the processor 804 data relating to the distance of the table 316 to the display device 302. As another example, the processor 804 may be configured to store in memory data relating to the distance of the detected the table 616 to the display device 302.

In some embodiments, the display device 302 may be configured to calibrate one or more previously stored viewing distances associated with a detected object. For example, a user may be prompted to transmit a remote control signal from one or more locations in the room 300, such as the sofa 315. In this example, the display device 302 may be configured to process data relating to the distance of the remote control device to adjust a previously saved viewing distance associated with detected the sofa 315 (illustrated as broken lines 615). In another example, the display device 302 may be configured to transmit data relating to the distance of the remote control device to the processor 804. In this example, the processor 804 may be configured to adjust a previously saved viewing distance associated with detected the sofa 315 based on information relating to the distance of the remote control device when a user is located at the sofa 315.

To determine which users are in the viewing area of an image capturing device, such as the camera 304, facial recognition of users in a captured image may be performed using a computing device. In some embodiments, a computing device may be configured to process data relating to one or more images of a user's face to identify whether the user is in the room during a content session. For example, the processor 804 may be configured to process data relating to the second user's 307 face (illustrated in FIG. 6 as broken lines 613), to determine that the second user 307 is located in the room 300. In one embodiment, a computing device may be configured to process data relating to one or more images of a user's face to identify whether a user is a child or an adult. For example, the processor 804 may be configured to process data relating to the second user's 307 face (illustrated in FIG. 6 as broken lines 613), to determine whether the second user 307 is a child or an adult. In some embodiments, the processor 804 may prompt a user to provide demographic information (e.g., sex, age, etc.) relating to the one or more users whose face has been recognized by the processor 804 or a computing device operatively coupled to the processor 804. Such demographic information may be stored in a user profile or account associated with the user whose face has been recognized. In other embodiments, to determine which users are viewing a display device, a computing device may be configured to process data relating to a user's eyes focus. In one of these embodiments, a computing device may be configured to process data relating to one or more captured images of a user's eyes to determine whether the user is viewing the display device. For example, the processor 804 may be configured to detect and/or monitor the first user's eyes 412 (illustrated in FIG. 6 as broken lines 612), to determine whether the first user 306 is viewing the display device 302.

To determine which users are viewing a display device, recognition of a transmitted remote control signal in one or more captured images may be performed using a computing device. In one embodiment, one or more computing devices may be configured to determine which user in a room initiated a remote control signal, transmitted from the remote control device, to determine whether that user is viewing the display device. In another embodiment, one or more computing devices may be configured to adjust one or more settings associated with the display device in accordance with the preferences of the user that initiated transmission of the remote control signal. For example, the processor 804 may be configured to determine that the first user 306 initiated remote control signal 618 (as illustrated in FIG. 6), and further configured to adjust one or more settings of the display device 302 in accordance with user preferences and/or a user profile associated with the first user 306.

There are a variety of ways to determine which user initiated a remote control signal. In one embodiment, the processor 804 may be configured to process data relating to one or more images captured by the camera 304 to determine proximity or the distance between the location of remote control signal 618 and a user. In another embodiment, the processor 804 may be further configured to associate initiation of the remote control signal 618 with the closest user to the signal upon transmission. For example, the processor 804 may be configured to associate the initiation of the remote control signal 618 with the first user 306 in view of the first user's 306 proximity to the remote control signal 618. In another embodiment, the processor 804 may be configured to process data relating to one or more images captured by the camera 304 to determine which user is holding or in possession of the remote control device. In other embodiments, the processor 804 may be configured to calculate the likelihood that a particular user is in control of the remote control device based on varying distances from the user in various directions.

In some embodiments, where a computing device is unable to recognize a user in the room, a computing device may be configured to store data associated with the new user. For example, the processor 804 may be configured to process data relating to one or more images captured by the camera 304 to determine a new user in the room 300. The processor 804 may be further configured to prompt the new user to select or more user and/or viewing preferences. The processor 804 may be further configured to store in memory data relating to the user preferences a detected user. In other embodiments, the processor 804 may be configured to adjust or customize one or more settings or user preferences in accordance with a detected user. In one of these embodiments, the processor 804 may be configured to adjust one or more settings of a computing device in accordance with the preferences of a specified user. For example, after determining that the first user 306 is in the room 300, the processor 804 may be configured to adjust one or more settings of the display device 302 in accordance with the stored user preferences and/or user profile of the first user 306. In another example, after determining that the second user 307 is in the room 300, the processor 804 may be configured to adjust one or more settings of the display device 302 in accordance with the stored user preferences and/or user profile of the second user 307. In yet another example, the processor 804 may be configured to determine which user profile is active during the present content session when adjusting the one or more settings of the display device 302.

In some embodiments, the camera 304 may be configured to detect the movements of one or more users in the room 300. In one embodiment, the camera 304 may be configured to constantly scan the room 300 to detect user movement. In other embodiments, the camera 304 may be configured to transmit information relating to a user's movement to one or more computing devices. For example, the camera 304 may be configured to transmit information relating to a user's movement to the processor 804. In some of these embodiments, the camera 304 may be configured to detect whether a user's viewing distance from the display device 302 has changed over time. In some embodiments, where the camera 304 has detected user movement, the camera 304 may be configured to communicate data to the processor 804 relating to the movement of one or more users. In one of these embodiments, the camera 304 may be configured to transmit to the processor 804 information relating to an updated viewing distance for one or more user.

In other embodiments, where the camera 304 has detected user movement, the processor 804 may be configured to process data relating to the movement of one or more users captured by the camera 304. In one of these embodiments, the processor 804 may be configured to determine an updated viewing distance based on the change in location of one or more users within the room. In another of these embodiments, the processor 804 may be configured to save in memory data relating to the updated location of one or more users. For example, the processor 804 may be configured to store in memory an updated viewing distance for one or more users viewing the display device 302. In some embodiments, the camera 304 may be configured to continuously monitor user movement and location within the room 300. In one of these embodiments, the processor 804 may be configured to continuously determine an updated viewing distance for one or more users in the room 300.

In one embodiment, the processor 804 may be configured to dynamically determine and/or adjust an image resource allocation for displaying content on the display device 302 based on user movement. In some embodiments, where an image capturing device has detected user movement, a computing device may be configured to determine and/or adjust an allocation of image resources for displaying content on a display device after the user movement has ceased. For example, referring to FIG. 6, if the first user 306 moves from the sofa 314 to the frame 308, the processor 804 may be configured to determine and/or adjust an allocation of image resources for displaying content on the display device 302 after user movement has ceased (e.g., when the first user 306 arrives at the frame 308). In another embodiment, the processor 804 may be configured to determine whether where a user has moved a predetermined distance within the viewing area. For example, the processor 804 may be configured to determine whether a user has moved a distance of 1 foot within the viewing area. In some of these embodiments, the processor 804 may be configured to adjust an allocation of image resources for displaying content if a user moves a threshold distance within the viewing area.

With respect to the eye focus of a user viewing a display device, in some embodiments, an image capturing device may be configured to detect a change in eye focus. For example, the camera 304 may be configured to determine that a user's field of view changes from a lower display region within the display area (e.g., the display device 302) to an upper region within the display area. In another example, the camera 304 may be configured to determine that a user's field of view changes from a center region within the display area to a left region within the display area. In some embodiments, the camera 304 may be configured to continuously determine the eye focus of a user by detecting and monitoring the user's eye movement. Thus, a computing device, such as the processor 804, may be configured to dynamically determine and/or adjust a resource allocation for displaying content on the display device 302 based on the user's eye movement. In other embodiments, a computing device, such as the processor 804 may be configured to determine the movement of one of the user's eyes when detecting a change in eye focus. In one of these embodiments, a user may have the option of determining which eye the system may monitor when detecting a change in eye focus. For example, the user may modify their user profile to establish that only their left eye should be monitored by the image capturing device (e.g., the camera 304). In this example, a computing device, such as the processor 804 may not monitor the user's right eye when processing data relating to a user's eye focus or movement. Similarly, in this example, the user's right eye may not be monitored to determine whether the user is viewing the display area or focusing on a particular region of the display area.

In some embodiments, the camera 304 may be configured to process information relating to a user's eye movement to determine what display region within the display area the user is viewing. For example, the camera 304 may be configured to process information relating to the position of a viewer's eyes and/or iris. In other embodiments, the camera 304 may be configured transmit information relating to a user's eye movement to one or more computing devices. For example, the camera 304 may be configured transmit information relating to a user's eye movement to the processor 804 or other computing devices operatively coupled to the processor 804. In some of these embodiments, the camera 304 may be configured to store in memory information relating to a user's eye movement. In other embodiments, the processor 804 may be configured to receive information relating to the size and position of a display region within the display area (e.g., the display device 302) where the user is focusing. In another embodiment the camera 304 may be configured to store in memory information relating to the size and location of a display region within the display area (e.g., the display device 302) where the user is focusing. In another embodiment, a computing device such as the processor 804 may be configured to determine the location of a user's eye focus based on information readily available to the processor, such as user activity displayed within the display area (e.g., the display device). For example, the processor 804 may determine the position of a user's eye focus by detecting the position of an input device, such as a mouse cursor or other pointer on the display device.

Content transmitted to the display device 302 may include one or more triggers embedded within the content to assist in identifying one or more display regions within the display area to visually emphasize to the user. These triggers may contain or have access to information identifying the subject matter of the transmitted content (e.g., video image). A plurality of triggers may be placed throughout the content to emphasize one or more images in the plurality of images comprising the transmitted content. For example, triggers may be embedded in the transmitted content to identify one or more regions within the display area to emphasize to the user while the content is being presented. In another example, different triggers may be placed throughout a television program. In this example, a director or content provider may embed triggers in the television program (e.g., displayed content), to identify certain images in the television program to be visually emphasized to the user. Various formats for the triggers may be used without departing from the scope of the present disclosure. In one embodiment, the trigger format may be the Enhanced TV Binary Interchange Format (EBIF).

In some embodiments, the user may have the option to calibrate an image capturing device's detection of eye movement and the one or more display regions within a display area that the user directs his or her eye focus. For example, the user may be prompted to direct their eye focus towards a series of images located on various regions within the display area. The user may also be prompted to direct their eye focus towards the display area from one or more locations within the room. In this example, the camera 304 may be configured to monitor a user's eye movement in response to a series of displayed images, and transmit to a computing device, such as the processor 804, information relating to the change in position of the user's pupil and/or iris (e.g., user eye movement) in response to each displayed image. In one of these embodiments, the processor 804 may be configured to receive data from an image capturing device, such as the camera 304, relating to a user's eye movement in response to one or more displayed images. In another of these embodiments, the processor 804 may be configured to process data relating to the user's eye movement to determine what region of the display area the user is viewing. One of skill in the art will appreciate that various other embodiments may be utilized to calibrate an image capturing device to detect user eye movement and what region of the display area a user is viewing, without departing from the scope of the present disclosure.

Returning to FIG. 8a, in one embodiment, one or more computing devices may be configured to adjust an image resource allocation for displaying content within a display area (e.g., display device(s)). For example, the processor 804 may be configured to adjust an image resource allocation for displaying content on the display device 302. The allocation of image resource for displaying content may encompass a variety of image resources or characteristics, including, but not limited to, image resolution, processing power per pixel, degree of image compression, image transmission rate, color depth, polygon count, texture resolution, etc. One of skill in the art will appreciate that various other image resources and combinations thereof may comprise an image resource allocation for displaying content within a display area.

As illustrated in FIG. 8a, the first user 306 is positioned in front of a display area (e.g., the display device 302)

having four display regions, such as a first display region 806, a second display region, 807, a third display region, 808, and a fourth display region 809. Although FIG. 8*a* illustrates a display having four display regions, one of ordinary skill in the art will recognize that the display area (e.g., the display device 302) may include any number of display regions. In some embodiments, a computing device such as the processor 804 may be configured to rank one or more display regions within a display area based on a viewer's eye focus. For example, referring to FIG. 8*a*, the processor 804 may be configured to rank the display regions for the display device 302 based on proximity to one or more display regions where user's 306 eyes are focused. In this example, the eye focus of the first user 306 is directed toward the display region 807, and thus, the processor 804 may rank the display region for the display device 302, from most to least important, as follows: the second display region 807 is ranked first, the first display region 806 and the third display region 808 are ranked second, and the fourth display region is ranked last. As will be described further below, display region rank may be used to determine and/or adjust an image resource allocation for displaying content on the display device.

In one of these embodiments, a user's eye focus may span multiple regions. For example, the eye focus of the first user 306 may span the display regions 806 and 807. In this example, the processor 804 may rank the display regions 806 and 807 with the same rank. Alternatively, the processor 804 may select one of the display regions 806 and 807 as having higher priority over the other. For instance, the processor 804 may be configured to prioritize the display region based on the location of the eye focus for one or more other users in a room. In another of these embodiments, display regions adjacent to the display regions where a user's eyes are focused may receive the same rank. For example, referring to FIG. 8*a*, the display regions 806 and 808 may receive the same rank.

In one embodiment, the processor 804 may be configured to determine that the eye focus of multiple viewers is in one or more display regions. For example, referring to the display area (e.g., the display device 302) in FIG. 8*a*, the first user 306 may focus his or her eye focus within the display region 807, while a second user in the room may be focusing his or her eye focus within the display region 809. In this example, the processor 804 may be configured to determine that the eye focus of the first user 306 and the second user is within the display regions 807 and 809, respectively. The processor 804 may be configured to assign multiple display regions the same rank. In this example, the display regions 807 and 809 may be assigned a ranking of first, while adjacent display regions (e.g., the regions 806 and 808) may be assigned a lower ranking. As another example, referring to FIG. 8*a*, the first user 306 may focus his or her eye focus within the display region 807, while a second user in the room may also direct his or her eye focus within the display region 807. In this example, the processor 804 may be configured to determine that the eye focus of the first user 306 and the second user is within the display region 807.

In other embodiments, the processor 804 may be configured to re-rank display regions in accordance with user eye movement. For example, referring to FIG. 8*a*, the first user 306 may shift his or her eye focus from the display region 807 to the display region 808, and the processor 804 may detect the change in user eye movement. In some embodiments, the processor 804 may determine whether the change in the position of a user's eye focus exceeds a predetermined movement threshold. In one of these embodiments, the predetermined threshold may depend on the location of one or more display regions. For example, referring to FIG. 8*a*, the predetermined threshold may be a virtual boundary between two display regions, such as the display regions 806 and 807. In this example, if the user eye focus changes from within the display region 807 to somewhere within the display region 806, the processor 804 may determine that the change in user eye focus exceeds the predetermined movement threshold.

As another example, the predetermined threshold may be a predetermined distance from the focal point of the user's eye focus. The processor 804 may be configured to detect the position (e.g., coordinates) of a user's eye focus within the display area. In this example, if the system detects user eye movement, the processor 804 may be configured to identify the new position of the user's eye focus and determine whether that updated position of the user's eye focus exceeds a predetermined distance (e.g., 10 pixels, 20 pixels, 50 pixels) from the previous position of the user's eye focus within the display area. In some embodiments where the change in user eye focus exceeds a predetermined movement threshold, the processor 804 may be configured to re-rank one or more display regions within the display area. For example, the processor 804 may be configured to re-rank a plurality of display regions based on a detected or updated position of a user's eye focus within the display area.

Referring to FIG. 8*a*, in some embodiments, the positions and/or size of display regions may be predetermined, e.g., the position and/or size of display regions do not change in response to user eye movement. In other embodiments, the position and/or size of display regions may be determined by the processor 804 in response to detecting a change in the position of a user's eye focus within the display area. For example, referring to FIG. 8*a*, the processor 804 may determine that the display region 807 extends 100 pixels above, below, to the right, and to the left of the focal point of the user's eye focus. In this example, the display region associated with the user's eye focus may include a square region 200 pixels in height and 200 pixels in width. In another example, the processor 804 may determine that the display region 807 extends 100 pixels in a radial direction from the focal point of the user's eye focus. In this example, the display region associated with the user's eye focus may include a circular region having a radius of 100 pixels.

In one embodiment, the size of one or more display regions may be determined by the processor 804 based on the availability of data transmission resources, such as bandwidth. For example, if the bandwidth of the network (e.g., network 100) decreases due to any number of reasons, such as increased network traffic, a computing device, such as the processor 804 or other computing device(s) operatively coupled to the processor 804, may detect this decrease in bandwidth and adjust the image resource allocation for displaying content on the display device. In this example, the processor 804 may be configured to decrease the size of the display region within the display area associated with the user's eye focus, which is generally transmitted using more image resources (e.g., higher resolution or transmission rate) than other regions within the display area. Similarly, if the bandwidth of the network (e.g., network 100 increases) due to any number of reasons, such as decreased network traffic, a computing device, such as the processor 804 or other computing device(s) operatively coupled to the processor 804, may detect this increase in bandwidth and adjust the image resource allocation for displaying content within the display area. In this example, the processor 804 may be configured to increase the size of the display region associated with a user's eye focus.

In other embodiments, a user may have the option of determining the amount of data transmission resources (e.g., bandwidth) associated with the transmission and displaying of content (e.g., video images) to a display device. For example, the user may set a minimum bandwidth level that the system must maintain while transmitting content to the display device. In this example, a computing device, such as the processor 804, may adjust the image resource allocation for displaying content on a display device in accordance with the bandwidth restrictions set by the user. In one of these embodiments, the processor 804 may be configured to request from one or more computing devices an amount of available data transmission resources (e.g., bandwidth) on the network.

In some embodiments a computing device, such as the processor 804, may be configured to rank one or more display regions within a display area based on image compression data included within the transmitted content. For example, referring to FIG. 8*a*, the processor 804 may be configured to rank the display regions for the display device 302 by analyzing image data relating to one or more frames (e.g., I-Frames, P-Frames, and/or B-frames) in the transmitted content. In this example, the processor 804 may analyze image data relating to the plurality of frames (e.g., I-Frames, P-Frames, and/or B-frames) in content being transmitted to the display device 302 to detect which portions of the display area are associated with the highest rate of image adjustment (e.g., rate of change or movement of an image between frames) during the transmission. In one of these embodiments, the processor 804 may rank one or more display regions for the display device 302 based on which portions of the display area are associated with the highest rate of image adjustment. For example, the processor 804 may assign a higher rank to display regions of the display device 302 corresponding to the portions of the display device 302 having higher rates of image adjustment. In another of these embodiments, the processor 804 may be configured to devote more image resources to those portions of the display area associated with a higher rate of image adjustment, and conversely, reduce the amount of image resources devoted to those portions of the display area associated with a lower rate of image adjustment.

In another embodiment, the display device 302 may be configured to rank one or more display regions within a display area in accordance with image compression data included within transmitted content. For example, the display device 302 may be configured to analyze image data relating to a plurality of frames (e.g., I-Frames, P-Frames, and/or B-frames) in the transmitted content, and detect which portions of the display area are associated with the highest rate of image adjustment during the transmission. In one of these embodiments, the display device 302 may be configured to devote more image resources to those portions of the display area associated with a higher rate of image adjustment, and reduce the amount of image resources devoted to those portions of the display area associated with a lower rate of image adjustment. In another of these embodiments, the display device 302 may rank one or more display regions based on those portions of the display area are associated with the highest rate of image adjustment. In another embodiment, a computing device, such as the processor 804 or other suitable computing device, may be configured to embed one or more data markers (e.g., triggers) in the transmitted content to identify one or more portions of the display area associated with a higher or lower rate of image adjustment. In this embodiment, the display device 302 may be configured to process the one or more data markers embedded within the content to determine which portions of the display area associated with a higher or lower rate of image adjustment. The display device 302 may be further configured to process the one or more data markers embedded within the content to determine a prioritization of image resources for one or more display regions.

In some embodiments, a computing device, such as the processor 804, may be configured to determine and/or adjust an image resource allocation for displaying content in one or more display regions within a display area. In one of these embodiments, a computing device, such as the processor 804, may be configured to adjust an image resource allocation for displaying content in accordance with the ranking of the one or more display regions within the display area. For example, referring to FIG. 8*a*, the display region associated with a user's eye focus (e.g., the display region 807) may be given a primary rank (e.g., ranked first) and assigned and/or allocated a high level of image resources (e.g., high image resolution, high frame rate, etc. . . . ). Furthermore, display regions adjacent to the region associated with the user's eye focus (e.g., the display regions 806 and 808) may be given a secondary rank (e.g., ranked second) and assigned and/or allocated a medium level of image resources. Lastly, display regions not adjacent to the region associated with the user's eye focus (e.g., the display region 809) may be given a tertiary rank (e.g., ranked third) and assigned and/or allocated a low level of image resources. In some embodiments, a plurality of ranks may be assigned to the one or more display regions within the display area. The processor 804 may be configured to assign a level of image resources to each display region in accordance with the ranking of that region. For example, higher-ranked display regions may be assigned and/or allocated higher levels of image resources, while lower-ranked display regions may be assigned and/or allocated lower levels of image resources.

In other embodiments, a computing device, such as the processor 804, may be configured to adjust an image resource allocation for displaying content based on the proximity of one or more pixels from a user's eye focus. For example, the processor 804 may be configured to determine the location (e.g., X and Y pixel coordinates) within the display area associated with the focal point of a user's eye focus. In one of these embodiments, a computing device, such as the processor 804, may be configured to adjust an image resource allocation for displaying content based on the distance of one or more pixels from the location of the focal point of a user's eye focus. For instance, the plurality of pixels within a 100 pixel radius of the location (e.g., X and Y pixel coordinates) within the display area associated with the focal point of a user's eye focus may be assigned and/or allocated a high level of image resources (e.g., high image resolution, high frame rate, etc. . . . ).

Similarly, the plurality of pixels between a 100 pixel and 250 pixel radius of the focal point of the user's eye focus may be assigned and/or allocated a lower (e.g., reduced) level of image resources than the plurality of pixels within the 100 pixel radius of the focal point of the user's eye focus. Likewise any pixels outside of the 250 radius of the focal point of the user's eye focus may be assigned and/or allocated a lower level of image resources than the plurality of pixels between the 100 pixel and 250 pixel radius of the focal point of the user's eye focus. Although the example above uses a 100 pixel radius to determine the various boundaries for allocating differing levels of image resources, one of ordinary skill in the art will appreciate that any number of pixels may be used to determine the size of the pixel radius (e.g., 25 pixels, 60 pixels, 100 pixels, etc.). In some embodiments, the level of image resources assigned and/or allocated to pixels within the display area may decrease moving outwardly from the focal point of a user's eye focus in a gradient fashion.

There may be a variety of ways in which image resources may be adjusted. For example, when determining and/or adjusting an image resource allocation for displaying content, a computing device, such as the processor 804, may be configured to adjust image resolution. The processor 804 may be configured to transmit higher-ranked display regions at a higher image resolution. For instance, the processor 804 or other computing devices operatively coupled to the processor 804 may be configured to transmit content within higher-ranked display regions (e.g., video images) at a first image resolution, and transmit content within lower-ranked display regions at a second image resolution, wherein the first resolution is higher than the second resolution. In some embodiments, the processor 804 may be configured to adjust the second resolution (e.g., the resolution of a lower-ranked display region) as a percentage of the first resolution. For instance, the higher-ranked display region may be transmitted at the first image resolution, while the lower-ranked display regions may be transmitted at 90% of the first image resolution. The processor 804 may also be configured to adjust image resolution based on the availability of data transmission resources on the network (e.g., network 100).

As another example, when determining and/or adjusting an image resource allocation for displaying content, a computing device, such as the processor 804, may be configured to adjust an image transmission rate. The processor 804 may be configured to transmit higher-ranked display regions at a higher image transmission rate (e.g., frame rate). For instance, the processor 804 or other computing devices operatively coupled to the processor 804 may be configured to transmit content within higher-ranked display regions at a first frame rate, and transmit content within lower-ranked display regions at a second frame rate, wherein the first frame rate is higher than the second frame rate. In some embodiments, the processor 804 may be configured to adjust the second frame rate (e.g., the frame rate of a lower-ranked display region) as a percentage of the first frame rate. For instance, the higher-ranked display region may be transmitted at 60 frames per second, while the lower-ranked display regions may be transmitted at 90% of the first frame rate (e.g., 12 fewer frames per second). In other embodiments, when determining and/or adjusting an image resource allocation for displaying content, the processor 804 may be configured to adjust the image transmission rate in accordance with the type of network connection (e.g., wide area network, wireless local area network, local area network, etc.). The processor 804 may also be configured to adjust image transmission rate based on the availability of data transmission resources on the network (e.g., network 100).

As yet another example, when determining and/or adjusting an image resource allocation for displaying content, a computing device, such as the processor 804, may be configured to adjust the processing power per pixel for one or more pixels within the display area (e.g., the display device 302). The processor 804 may be configured to transmit higher-ranked display regions at a higher processing power per pixel. For instance, the processor 804 or other computing devices operatively coupled to the processor 804 may be configured to transmit content within higher-ranked display regions at a first processing power per pixel ratio (e.g., floating point operations per second ("FLOPS")-per-pixel), and transmit content within lower-ranked display regions at a second processing power per pixel ratio, wherein the first processing power per pixel ratio is higher than the second processing power per pixel ratio. In some embodiments, the processor 804 may be configured to adjust the second processing power per pixel ratio as a percentage of the first processing power per pixel ratio. For instance, the higher-ranked display region may be transmitted at 400 FLOPS/pixel, while the lower-ranked display regions may be transmitted at 90% of the first processing power per pixel ratio (e.g., 360 FLOPS/pixel). In some embodiments, the processor 804 may be configured to transmit instructions to a computing device, such as a graphics processing unit associated with the display device 302, to adjust the processing power per pixel for one or more display regions within the display area. The processor 804 may also be configured to adjust processing power per pixel ratios based on the availability of data transmission resources on the network (e.g., network 100).

As another example, in cases where content transmitted to a display device is rendered in 3D, when determining and/or adjusting an image resource allocation for displaying content, a computing device, such as the processor 804, may be configured to adjust the polygon count of images displayed on the display device. The processor 804 may be configured to transmit 3D rendered images within higher-ranked display regions at a higher polygon count, and transmit 3D rendered images within lower-ranked display regions at a lower polygon count. In still other examples, a computing device, such as the processor 804, may be further configured to adjust texture resolution. The processor 804 may be configured to transmit higher-ranked display regions at a higher texture resolution. For instance, the processor 804 or other computing devices operatively coupled to the processor 804 may be configured to transmit content (e.g., 3D rendered images) within higher-ranked display regions at a first texture resolution, and transmit content within lower-ranked display regions at a second texture resolution, wherein the first texture resolution is higher than the second texture resolution. In some embodiments, the processor 804 may be configured to adjust shading/lighting models associated with rendering 3D content displayed on a display device by modifying one or more algorithms defined in a software application program, such as a pixel shader. For example, the processor 804 or other computing devices operatively coupled to the processor 804 may be configured to transmit content (e.g., 3D rendered images) within one or more higher-ranked display regions using a first shading algorithm and transmit content within one or more lower-ranked display regions using a second shading algorithm. As will be appreciated, various shading algorithms may be utilized by a suitable software application program to render 3D images, such as flat shading, Gouraud shading, Phong shading, etc.

As still another example, when determining and/or adjusting an image resource allocation for displaying content, a computing device, such as the processor 804, may be configured to adjust the bit depth of the content transmitted to the display device(s). As yet another example, when determining and/or adjusting an image resource allocation for displaying content, a computing device, such as the processor 804, may be configured to adjust a degree of image compression for content transmitted to the display device(s). The processor 804 may be configured to transmit higher-ranked display regions at a higher degree of compression (e.g., higher bit rate). For instance, the processor 804 or other computing devices operatively coupled to the processor 804 may be configured to transmit content within higher-ranked display regions at a first bit rate, and transmit content within lower-ranked display regions at a second bit rate, wherein the first bit rate is higher than the second bit rate. In some embodiments, the processor 804 may be configured to adjust the second bit rate (e.g., the bit rate of a lower-ranked display region) as a percentage of the first bit rate. For instance, the higher-ranked display region may be transmitted at 8 Mbps, while the lower-ranked display regions may be transmitted at 90% of the first bit rate (e.g., 7.2 Mbps). The processor 804 may also be configured to adjust bit rates based on the availability of data transmission resources on the network (e.g., network 100).

An allocation of image resources may be determined and/or adjusted based on any various combination of the image resources (e.g., characteristics) discussed above. For example, in some embodiments, a computing device, such as the processor 804, may be configured to simultaneously adjust one or more image characteristics such as image resolution, degree of image compression, bit rate, and/or processing power per pixel. In other embodiments, when determining and/or adjusting an image resource allocation for displaying content, a computing device, such as the processor 804, may be configured to prioritize the order in which the one or more image characteristics may be adjusted. In one of these embodiments, the processor 804 may be configured to prioritize the order in which one or more image characteristics are adjusted based on the viewing distance of one or more users in a room. For example, if a user is within a first threshold distance to the display device 302, the processor 804 may be configured to first adjust the image resolution of content transmitted to the display device 302, and then subsequently adjust one or more other image characteristics. In this example, if a user is within a second threshold distance, wherein the second threshold distance is a further viewing distance than the first threshold distance, the processor 804 may be configured to first adjust the degree of image compression for the content transmitted to the display device 302.

In some embodiments, the processor 804 may be configured to adjust one or more image characteristics within a threshold image resource range. In one of these embodiments, the processor 804 may be configured to adjust a first image resolution of content transmitted to the display device 302 between a minimum and maximum level of image resolution. For example, the processor 804 may be configured to adjust the image resolution of content transmitted to the display device 302 between a minimum image resolution (e.g., 1,000 pixels-per-inch) and a maximum image resolution (e.g., 10,000 pixels-per-inch) within a first display region. In this example, the minimum and maximum levels of image resolution (e.g., threshold image resource range) may be modified by one or more viewers viewing the display device 302. In another example, the minimum and maximum levels of image resolution may be modified by an administrator for the content provider.

In another of these embodiments, the processor 804 may be configured to adjust the threshold image resource range based on the viewing distance of one or more users viewing the display device 302. For example, if a user moves a certain distance from the display device 302 such that their current viewing distance exceeds a threshold viewing distance, a computing device, such as the processor 804 or other computing device(s) operatively coupled to the processor 804, may detect the user's current viewing distance and adjust the maximum level of image resolution downward. In this example, the processor 804 may be configured to decrease the maximum level of image resolution for transmitting content because the user may no longer visually perceive the benefits of a higher image resolution given their current viewing distance (e.g., the user is too far from a display device to distinguish content transmitted at higher levels of image resolution). Similarly, if the user's viewing distance decreased, a computing device, such as the processor 804 or other computing device(s) operatively coupled to the processor 804, may detect this decrease in viewing distance and adjust the maximum level of image resolution upward.

In still another of these embodiments, the processor 804 may be configured to adjust the threshold image resource range based on the availability of data transmission resources, such as bandwidth. For example, if the bandwidth of the network (e.g., network 100) decreases due to any number of reasons, such as increased network traffic, a computing device, such as the processor 804 or other computing device(s) operatively coupled to the processor 804, may detect this decrease in bandwidth and adjust the maximum level of image resolution downward. In this example, the processor 804 may be configured to decrease the maximum level of image resolution for transmitting content given that content transmitted at higher levels of image resolution consumes more bandwidth than content transmitted at a lower level of image resolution. Similarly, if the bandwidth of the network (e.g., network 100) increases due to any number of reasons, such as decreased network traffic, a computing device, such as the processor 804 or other computing device(s) operatively coupled to the processor 804, may detect this increase in bandwidth and adjust the maximum level of image resolution upward.

In yet another of these embodiments, the processor 804 may be configured to adjust a threshold image resource range based on one or more technical limitations of the display device 302, such as display screen resolution or display size. For example, for display devices having smaller display screens, a computing device, such as the processor 804 or other computing device(s) operatively coupled to the processor 804, may detect the size of the display screen and adjust a default maximum level of image resolution downward. In this example, the processor 804 may be configured to decrease the default maximum level of image resolution for transmitting content on a display device because the user may no longer visually perceive the benefits of a higher image resolution given the size of the display area (e.g., the display screen of a display device is too small for a user to distinguish content transmitted at higher levels of image resolution). As another example, if the display area increases for any number of reasons, such as content is transmitted on a larger portion of the display device, or to a different, larger display screen, a computing device, such as the processor 804 or other computing device(s) operatively coupled to the processor 804, may detect the increase in the display area and adjust the maximum level of image resolution upward.

In some embodiments, when adjusting an allocation of image resources for a first image characteristic, the processor 804 may be configured to begin adjusting a second image characteristic when a threshold image resource range for the first image characteristic has been met and/or exceeded. For example, where the maximum image resolution has been set to 10,000 pixels-per-inch and the processor 804 adjusts image resolution (e.g., the first image characteristic) by increasing the image resolution of a first display region, the processor 804 may be configured to stop adjusting the image resolution of content transmitted to the first display region when the image resolution of that region reaches and/or exceeds 10,000 pixels-per-inch. In this example, when the maximum image resolution of the first display region has been met and/or exceeded, the processor 804 may be configured to begin adjusting the degree of image compression or other image characteristic (e.g., second image characteristic) for content transmitted to the first display region.

In another embodiment, when adjusting an allocation of image resources for a first image characteristic, the processor 804 may be configured to begin adjusting a second image characteristic based on an availability of data transmission resources, such as bandwidth. For example, where the image resolution for a first display region has been increased, the processor 804 may be configured to stop adjusting the image resolution of content transmitted to the first display region when the amount of bandwidth (e.g., transmission resources) consumed by the system meets or exceeds a maximum threshold limit. In this example, when the maximum bandwidth threshold limit has been met and/or exceeded, the processor 804 may be configured to begin adjusting the degree of image compression or other image characteristic (e.g., second image characteristic) for content transmitted to the first display region. As will be appreciated, there a variety of ways in which the transmission resources threshold limit may be set and/or modified. For example, one or more users operating the display device 302 may have the option of setting and/or modifying the transmission resources threshold limit. As another example, the transmission resources threshold limit may be set and/or modified by an administrator for the content or network provider. As still another example, a computing device, such as the processor 804, may be configured to adjust the transmission resources threshold limit based on a level of data transmission resource usage and/or data transmission resource demand for the system.

In some embodiments, where an image resource allocation for displaying content on a display device is adjusted, one or more computer devices may be configured to store in memory the content transmitted to the display device. In one of these embodiments, a computing device, such as the processor 804, may be configured to store in memory content presented to the user having an adjusted resource allocation for displaying said content. In another of these embodiments, a computing device, such as the processor 804, may be configured to store in memory the original content (i.e., content displayed utilizing an initial, non-adjusted image resource allocation) transmitted to the display device. In this example, although a user may be presented with content on a display device having an adjusted image resource allocation, the processor 804 may be configured to store in memory the original content that is transmitted to the user from the content provider.

In one embodiment, one or more computing devices associated with the camera 304 and the display device 302 may be configured to determine and/or adjust an image resource allocation for displaying content on the display device 302. In some embodiments, one or more computing devices operatively coupled to the processor 804 may be configured to determine and/or adjust an image resource allocation for displaying content on the display device 302. For example, the gateway 111 may be configured to adjust an image resource allocation for displaying content on the display device 302. In this example, the gateway 111 may be further configured to transmit information to one or more computing devices, such as the processor 804, regarding the adjustment of an image resource allocation for displaying content on the display device 302. In other embodiments, the processor 804 may be configured to transmit information to one or more computer devices, such as the gateway 111, regarding the adjustment of an image resource allocation for displaying content on the display device 302.

In some embodiments, one or more computing devices may be configured to determine and/or adjust an image resource allocation for displaying content on a display device in accordance with one or more triggers embedded in said content. For example, a trigger may be embedded in content transmitted to the display device 302 identifying one or more portions of the image on the display device 302 where a character's face may be displayed. In this example, the processor 804 may be configured to process information associated with one or more embedded triggers to adjust the allocation of image resources (e.g., image resolution) for displaying content within those portions of the display device 302 where the character's face may be displayed. In other embodiments, a trigger may be embedded in content transmitted to the display device 302 identifying one or more portions of the image on the display device 302 to be visually emphasized to the user. The embedded triggers may contain information identifying different characteristics of the content being transmitted, such as content type or subject matter, content duration, image resource allocations, etc.

In one of these embodiments, the processor 804 may be configured to process information associated with one or more embedded triggers identifying the particular position on a display device where image resources should be allocated. For example, the one or more triggers detected by the system may contain information identifying one or more display regions within the display area and their respective allocation of image resources. In this example, the processor 804 may be configured to increase or decrease the image resolution, degree of image compression, and/or other image characteristic for one or more display regions within the display area in accordance with information obtained from the one or more embedded triggers. Information obtained from the one or more triggers may also include a priority ranking for one or more display regions within the display area (to be discussed further below).

In another of these embodiments, the one or more triggers detected by the system may contain coordinate information identifying one or more locations (e.g., coordinates) within the display area to visually emphasize to the viewer. For example, the coordinate information obtained from the one or more triggers may indicate the specific horizontal and vertical coordinates (e.g., X and Y pixel coordinates) within the display area where a viewer's eyes should focus (e.g., virtual focal point of user's eye focus). The one or more display regions associated with the identified coordinates may receive a higher rank and/or level of image resources, while display regions moving away from the identified coordinates may receive a lower rank and/or level of image resources. In some instances, display regions moving away from the identified coordinates (or region associated with the identified coordinates), such as in a radial fashion, may be assigned or allocated lower levels of image resources in a gradient fashion. Similarly, display regions moving away from the identified coordinates (or region associated with the identified coordinates), such as in a radial fashion, may be assigned lower rankings (e.g., priority) in a gradient fashion.

In some embodiments, one or more computing devices may be configured to determine and/or adjust an image resource allocation for displaying content on the display device 302 in accordance with a user's viewing distance from the display device 302. For example, the processor 804 may be configured to determine and/or adjust an image resource allocation for displaying content on the display device 302 in accordance with the first user's 306 viewing distance from the display device 302. In this example, the viewing distance of the first user 306 (as illustrated by a viewing distance 808) is processed by the processor 804, as illustrated by the processing cloud 810. The processing clouds used throughout the disclosure are for illustrative purposes only and are not intended to limit or define the manner in which certain information is processed.

In one embodiment, a computing device, such as the processor 804, may be configured to adjust an image resource allocation for displaying content on the display device 302 in accordance with the viewing distance of the user closest to the display device 302 (e.g., shortest viewing distance). In another embodiment, a computing device, such as the processor 804, may be configured to determine and/or adjust an image resource allocation for displaying content on the display device 302 in accordance with the viewing distance of the user closest to a transmitted remote control signal, as illustrated by element 620 in the processing cloud 810. In some embodiments, a computing device, such as the processor 804, may be configured to determine and/or adjust an image resource allocation for displaying content on the display device 302 in accordance with one or more viewing distances stored in a user profile. In one embodiment, a computing device, such as the processor 804, may be configured to determine and/or adjust an image resource allocation for displaying content on the display device 302 when the user exceeds a threshold distance from the display device 302. For example, the processor 804 may be configured to reduce the image resolution of the content displayed on the display device 302 to a predetermined level of resolution when the user is more than 10 feet from the display device. In another example, the processor 804 may be configured to reduce the image resolution of the content displayed on the display device 302 to a predetermined level of resolution when the user is more than 15 feet from the display device.

In one of these embodiments, the processor 804 may be configured to identify an active user profile for the purpose of determining and/or adjusting an image resource allocation for displaying content on the display device 302 in accordance with the distance of the user associated with the identified user profile. In yet another embodiment, the processor 804 may be configured to determine and/or adjust an image resource allocation for displaying content on the display device 302 based on the aggregate viewing distance of multiple users viewing the display device 302 within the room 300. For example, the processor 804 may be configured to determine and/or adjust an image resource allocation for displaying content on the display device 302 based on a weighted average viewing distance of multiple users within the room 300. In another example, referring to FIG. 5, the processor 804 may be configured to determine and/or adjust an image resource allocation for displaying content on the display device 302 based on the average distance of the first user 306 and the second user 307 from the display device 302.

In other embodiments, the processor 804 may be configured to determine and/or adjust an image resource allocation based on a weighted average of one or more distances of users in the room. The processor 804 may be configured to weight (e.g., prioritize) the viewing distance of specific users in a room over other users. For example, the processor 804 may be configured to apply one or more weights to the viewing distance of the user(s) associated with a user profile or account. For example, the processor 804 may be configured to detect a user within the room 300 associated with a stored user profile, and apply one or more weights to the viewing distance of that user when determining an average user viewing distance. In some embodiments, the processor 804 may be configured to weight (e.g., prioritize) the viewing distance of one or more users in a room based on the type or subject matter of content being transmitted. For example, if children's video programming is being transmitted, the processor 804 may be configured to apply one or more weights to the viewing distance of any user(s) under a predetermined age that are viewing the display device.

In some embodiments, a computing device, such as the processor 804 may be configured to determine and/or adjust an image resource allocation for displaying content on the display device 302 in based on a predetermined viewing distance or range of distances for a user viewing the display device. A fixed viewing distance from a display device or range of distances from a display device (e.g., maximum and minimum distance) may be calculated to optimize the visual experience of a user. Optimal viewing distances for a user are based on the size of the display device. For example, manufacturers or retailers of a display device may provide a recommended viewing distance for viewing the display device based on the size of the display area for that display device. In one of these embodiments, the processor 804 may be configured to retrieve from memory one or more predetermined viewing distances for the display device 302.

In another of these embodiments, the processor 804 may determine and/or adjust an image resource allocation for displaying content on the display device 302 based on a comparison of the predetermined viewing distance with the actual viewing distance of one or more users viewing the display device 302. For example, the processor 804 may determine a first allocation of image resources based on the predetermined viewing distance for the display device 302 in accordance with one or more embodiments of the present disclosure. In this example, the processor 804 may be configured to adjust the first allocation of image resources in accordance with the actual (e.g., determined) viewing distances of one or more user viewing the display device 302. As will be appreciated, the processor 804 may utilize the predetermined viewing distance for the display device 302 to determine a baseline allocation of image resources, and may subsequently adjust said allocation of resources based on the movement of one or more users within the viewing area.

In other embodiments, a computing device, such as the processor 804, may be configured to determine and/or adjust an image resource allocation for displaying content on the display device 302 based on the size of the display area. For example, the processor 804 may be configured to determine a predetermined viewing distance in accordance with the size of the display area for the display device 302. In this example, the processor 804 may be configured to determine and/or adjust an allocation of image resources for transmitting content to the display device 302 in accordance with the predetermined viewing distance. In one of these embodiments, as discussed in more detail further below, the size of a display region associated with a user's eye focus may be determined in accordance with the size of the display area.

In other embodiments, when determining and/or adjusting an image resource allocation for displaying content on a display device, the processor 804 may be configured to exclude the viewing distances of one or more users. In one of these embodiments, the processor 804 may be configured to determine whether a user is exiting or entering a room, and exclude that user's viewing distance when determining and/or adjusting image resource allocations. The processor 804 may determine that a user is entering or exiting a room by recognizing that the user is within a predetermined distance from and/or moving towards an exit (e.g., door) within the room. In another of these embodiments, the processor 804 may be configured to determine whether one or more users are within a predetermined distance relative to the display area, and exclude those users' viewing distance when determining and/or adjusting image resource allocations. For example, any users having a viewing distance greater than 15 feet from a display device may be excluded. As another example, any users having a viewing distance greater than and/or less than 3 feet from the predetermined viewing distance for the display device 302 may be excluded. In yet another of these embodiments, the processor 804 may be configured to exclude one or more users' viewing distance based on the subject matter or type of content being transmitted to the display device. For example, if children's video programming is being transmitted, the processor 804 may be configured to exclude the viewing distances of any viewers over a predetermined age. In still another of these embodiments, the processor 804 may be configured to exclude one or more user's viewing distance based on whether the user is focusing his or eye upon the display device. As will be appreciated, in accordance with the examples of excluding one or more user viewing distances provided above, the processor 804 may be configured to exclude the viewing distance of one or more users when determining the average viewing distance of multiple users within a viewing area.

In some embodiments, one or more computing devices may be configured to determine and/or adjust an image resource allocation for displaying content on a display device in accordance with data relating to the eye focus a user. For example, the processor 804 may be configured to determine and/or adjust an image resource allocation for displaying content based on data relating to the location of a user's eye focus within the display area (e.g., the display device 302). As another example, the processor 804 may be configured to determine and/or adjust an image resource allocation for displaying content on the display device 302 in accordance with data relating to the change in position (e.g., movement) of the first user's eyes 412, as illustrated in FIG. 8b as broken lines 612 within the processing cloud 810. In another embodiment, when user eye movement is detected and the user is also moving within the room 300, the processor 804 may be configured to determine and/or adjust an image resource allocation for displaying content on the display device 302 after user movement has ceased. For example, if user movement is detected, the processor 804 may be configured to reduce the image resolution of content displayed on one or more regions of the display device 302 while the user is moving. In yet another embodiment, when user eye movement is detected and the user is also moving within the room 300, the processor 804 may be configured to determine and/or adjust an allocation of image resources a predetermined period of time after user movement has ceased.

Referring to FIG. 8b, the image resource allocation for displaying content on the display device 302 may be adjusted by a computing device, such as the processor 804, in accordance with data relating to the user's eye focus. In some embodiments, the image resource allocation for displaying content on the display device 302 may be adjusted such that the allocation of image resources is higher at a central region of the display area where the user's eyes are focused. In other embodiments, the image resource allocation for displaying content on the display device 302 may be adjusted such that the image resolution of the displayed content may be reduced in one or more regions of the display device 302 where a user's eyes are not focused. For example, the processor 804 may be configured to transmit content at a higher image resolution for the region of the display area where the user's eyes are focused, as illustrated by a display region 814. In this example, the processor 804 may transmit content at a lower image resolution for those portions of the display area outside of the display region 814.

As will be appreciated, there are a variety of ways in which to determine the size of the central region of the display area associated with a user's eye focus. In one embodiment, a user may have the option of establishing the size of the central region by using a slider tool that adjusts the size of the central region. In another embodiment, a computing device, such as the processor 804, may determine a size of the central region based on the size of the display area. For example, the processor 804 may determine a size of the central region, wherein the geometric area of the central region is a percentage of the geometric area of the display screen for the display device. For instance, where the geometric area of the central region is a percentage (%) of the geometric area of the display screen, and where the display screen is a rectangle consisting of (1) pixels in length and (w) pixels in width, the geometric area (e.g., size) of the central region may be calculated as follows:

$$\text{Geometric Area of Central Region (in pixels)} = \sqrt{(((1*w)*\%)/\pi)}$$

In some embodiments, one or more computing devices may be configured to adjust the image resource allocation for displaying content such that the image resolution of the displayed content may be highest near a central region of the display area associated with the user's eye focus, and gradually decrease in a radial gradient from the central region of where the user's eyes are focused within the display area to the periphery of where the user's eyes are focused within the display area. In one of these embodiments, the processor 804 may be configured to reduce image resources, by a predetermined factor, for a first outer region of the display area, wherein said outer region is a predetermined distance from the central region of where the user's eyes are focused, as illustrated by a display region 815 in FIG. 8b. For example, the processor 804 may be configured to reduce image resources by one-half for a first outer region, wherein said first outer region consists of the plurality of pixels outside the central region but within a predetermined distance from the central region (e.g., the display region 815). As will be appreciated, the processor 804 may be configured to further reduce image resources for a plurality of outer regions, wherein each outer region is a predetermined distance from the central region of where the user's eyes are focused.

Users viewing content on the display device 302 may have varying limits of visual capacity. In some embodiments, a user may modify the default size of the central region of eye focus (e.g., the display region 814) utilized by the system to determine and/or adjust a resource allocation for displaying content on a display device. In one of these embodiments, a computing device, such as the processor 804, may be configured to calibrate the size of the central region of eye focus within the display area based on the user's visual capacity. The term "visual capacity" encompasses various metrics to determine a user's ability to view and comprehend visual images, including, but not limited to a user's visual acuity, peripheral vision, and other visual metrics known to one of ordinary skill in the art. For example, the processor 804 may be configured to identify a user's visual capacity, such as visual acuity, and adjust the size of the central region of eye focus within the display area in accordance with the determined visual capacity. One of skill in the art will appreciate that various other embodiments may be utilized to calibrate the size of the central area of eye focus, without departing from the scope of the present disclosure. For example, the display device 302 may display various images to a user, and based on information provided by the user, the one or more computing devices may be configured to process the user feedback to determine the limits of the user's visual capacity (e.g., visual acuity, peripheral vision, etc.). In another example, the user may be provided with a slider option to adjust the size of the central region of focus within the display area, thus allowing the user to prioritize the allocation of image resources within the central region of the display area associated with the user's eye focus, as well as other regions, such as those regions associated with the periphery of the user's eye focus.

In another embodiment, a user may adjust the default radial image resolution gradient utilized by the system based on the user's visual acuity and/or peripheral vision. In other embodiments, a user may adjust the default image resolution utilized by the system. In one of these embodiments, the user may have the option of calibrating the default image resolution of the content displayed on the display device 302 based on the user's visual acuity. For example, the display device 302 may display various images or content to a user, and based on feedback provided by the user, one or more computing devices may be configured to process user input to determine an optimal image resolution for displaying content within the display area (e.g., the display device 302) based on the user's visual acuity. In another example, the user may be provided with a slider option that adjusts the image resolution of content displayed within the display area, thus allowing the user to provide the system with data relating to the user's display preferences.

FIG. 9 depicts a flowchart for an exemplary method according to one embodiment of the disclosure, which can be performed by one or more computing devices such as the gateway 111, the display device 302, the camera 304, the server 107, the processor 804, or any other desired computing device. When describing the steps of the method below, the term "system" may be used when referring to each component, either singularly or collectively, employed at each step of the method. Such usage is merely for ease in discussing the method, and should not be interpreted as limiting the exact embodiment in which the following method may be performed.

Figure 9A:
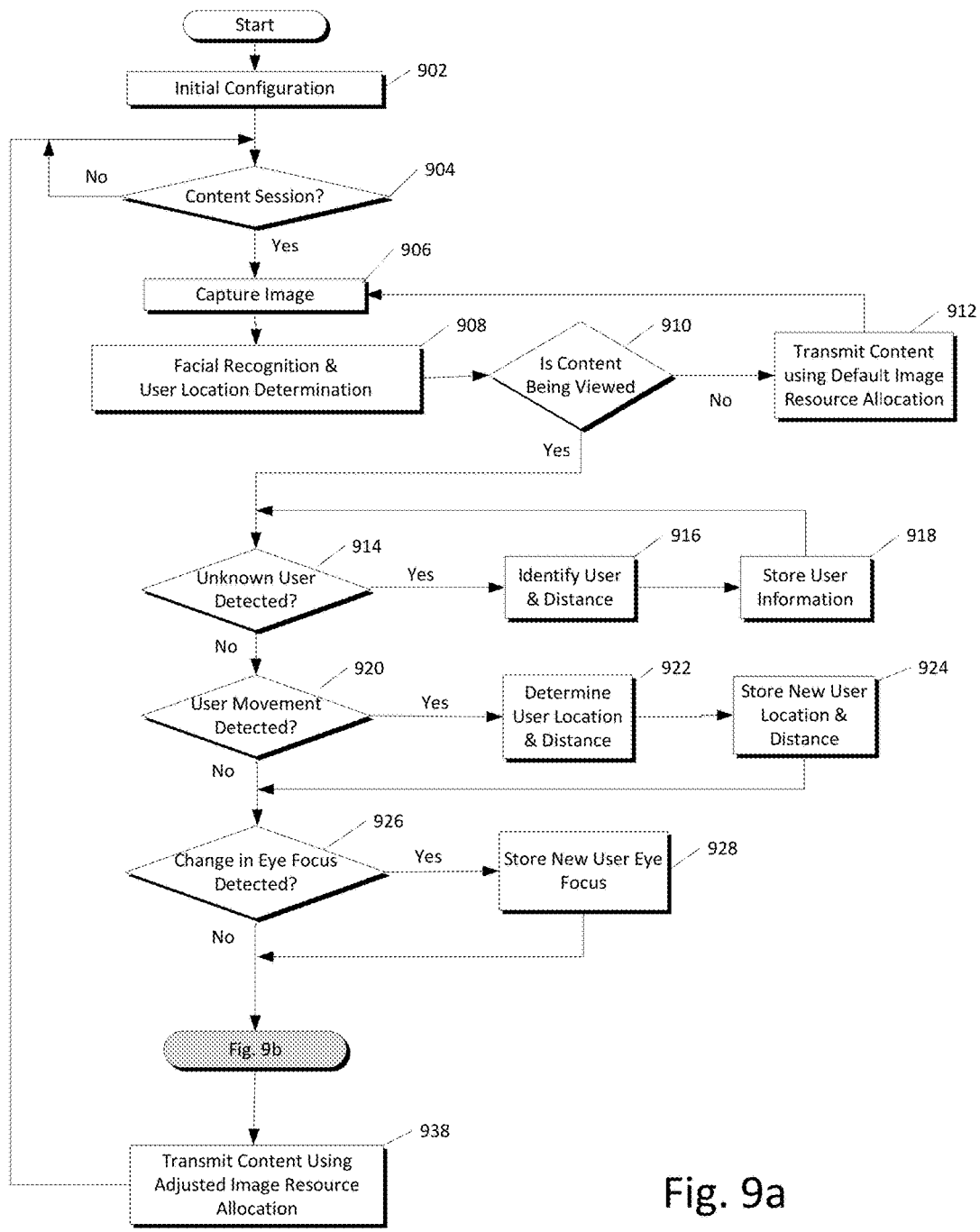
FIG. 9*a* illustrates an exemplary flowchart of a method in accordance with one or more aspects of the present disclosure.

Referring to FIG. 9a, at step 902, an initial configuration of the system may be performed such as a calibration of a camera and/or a display device, or loading of previously saved user profile information and other associated data. Other system configuration may include identifying one or more display regions within the display area (e.g., the display device), calibration of a default image resource allocation, calibration of a user's central eye focus or preferred image resolution gradient, and various other user preferences. At step 904, the system may determine whether a content session is currently active or in progress. A content session may occur when the system is in the process of providing content for a user's consumption, such as displaying a television program for a user to view. If there is presently no active content session, the device may repeat step 904 until the device determines that there is an active content session.

In this example, if the system determines that a content session is currently active or in progress, the method may proceed to step 906, where the system may capture one or more images of the room or viewing area using an image capturing device (e.g., the camera 304), which may be integrated into a display device. FIGS. 4 and 6 are illustrations of examples of captured images of the viewing area. An image capturing device may capture an image or a plurality of images. One or more image capturing devices may also be used to capture the plurality of images which may be used to compose a captured image for processing by the system. For example, different cameras which are configured to capture light in different electromagnetic spectrums may be used to capture the images. A composed captured image for processing may be formed from a combination of visible light and light outside the visible spectrum such as infrared radiation. One or more image capturing devices may be used to capture or collect 3D information of objects within the viewing area to recognize and/or determine one or more users, their bodies, user eye movement, the remote control device or signal, and various other objects.

In this example, after the viewing area image has been captured by an image capturing device, such as a camera, the captured image may be analyzed for facial recognition and user location determination at step 908. During step 908, the location of one or more users within the viewing area may be stored by the system, as well as information identifying one or more users in the captured image(s). The system may also be configured to store information relating to the viewing distance of one or more users in the captured image(s).

At step 910, the system may determine whether one or more users in the captured image(s) are viewing the content displayed on the display device. If there is (are) presently no user(s) viewing the display device, the method may proceed to step 912, where the system may transmit content (e.g., output one or more images) for display within the display area (e.g., the display device) in accordance with a default image resource allocation. In some embodiments, if there is (are) presently no user(s) viewing the display device, the system may continue to transmit content for display within the display area (e.g., the display device) in accordance with the current (e.g., most recent) allocation of image resources. In this example, after the system transmits the content for display within the display area (e.g., the display device) in accordance with the appropriate image resource allocation, the method may return to step 906, where the system may capture additional image(s) of the viewing area using an image capturing device.

Returning to step 910, after a determination has been made that one or more users are viewing content on the display device, the method may proceed to step 914, where the system may determine whether one or more users in the viewing area have not been previously recognized by the system. In this example, if the system detects an unknown user in the viewing area, the method may proceed to step 916. As will be appreciated, in some embodiments, the system may be configured to not perform steps 914, 916, and 918. For example, a user may be provided with a preference option permitting the user to identify whether the system may determine and/or adjust image resource allocations based on the location of unknown users within the viewing area.

At step 916, the system may identify the unknown user detected during step 914, and determine the unknown user's viewing location and viewing distance from the display device. During step 916, the system may prompt the user to input user data and/or other preferences. At step 918, the system may store the information determined and/or collected during step 916. In this example, after the system stores this information, the method can return to step 914 and the system identifies whether additional users in the viewing area have not been previously detected. In some embodiments, the system may simultaneously perform steps 916 and 918 for each of the unknown users detected during step 914, and the method may proceed to step 920 after step 918. In other embodiments, the system may be configured to skip steps 914, 916, and 918 where at least one or more users in the viewing area have been previously detected or recognized by the system.

After detecting one or more unknown users in the viewing area, the method may proceed to step 920, where the system may determine whether any user movement in the viewing area has been detected. During step 920, the system may identify one or more users in the viewing area associated with the detected movement. In this example, if the system detects user movement in the viewing area, the method may proceed to step 922. At step 922, the system may determine the location of one or more users in the viewing area associated with the movement detected during step 920. During step 922, the system may determine the viewing distance(s) of one or more users in the viewing area associated with the movement detected during step 920. At step 924, the system may store in memory the location, viewing distance(s), and other data determined and collected during step 922. In some embodiments, the system may perform steps 922 and 924 for each user associated with the movement detected in step 920.

In some embodiments, the system may be configured to perform steps 920, 922, and 924 for a subset of the users in the viewing area. For example, the system may be configured to perform steps 920, 922, and 924 for the user(s) in the viewing area associated with an active user profile. In another example, the system may be configured to perform steps 920, 922, and 924 for the user(s) in the viewing area based on stored user preferences. In other embodiments, the system may be configured to skip one or more of steps 920, 922, and 924.

At step 926, the system may determine whether one or more users in the viewing area have directed their eye focus to a different location of the display device. During step 926, the system may determine whether one or more users have directed their eye focus on a different display region on the display device. In this example, if the system detects a change in eye focus for one or more users in the viewing area, the method may proceed to step 928, where the system may store in memory the location of the detected user eye focus, along with other data for the one or more users associated with the change in eye focus detected in step 926. As will be appreciated, in some embodiments, the system may be configured to skip steps 926 and 928. In one of these embodiments, the system may be configured not to monitor or detect a change in one or more user's eye focus when the one or more users in the viewing area are outside of a threshold viewing distance. For example, if all of the users in the viewing area are more than 15 feet from the display device, the system may not detect or monitor the change in a user's eye focus since the user(s) are sufficiently far away to not warrant this form of tracking.

Figure 9B:
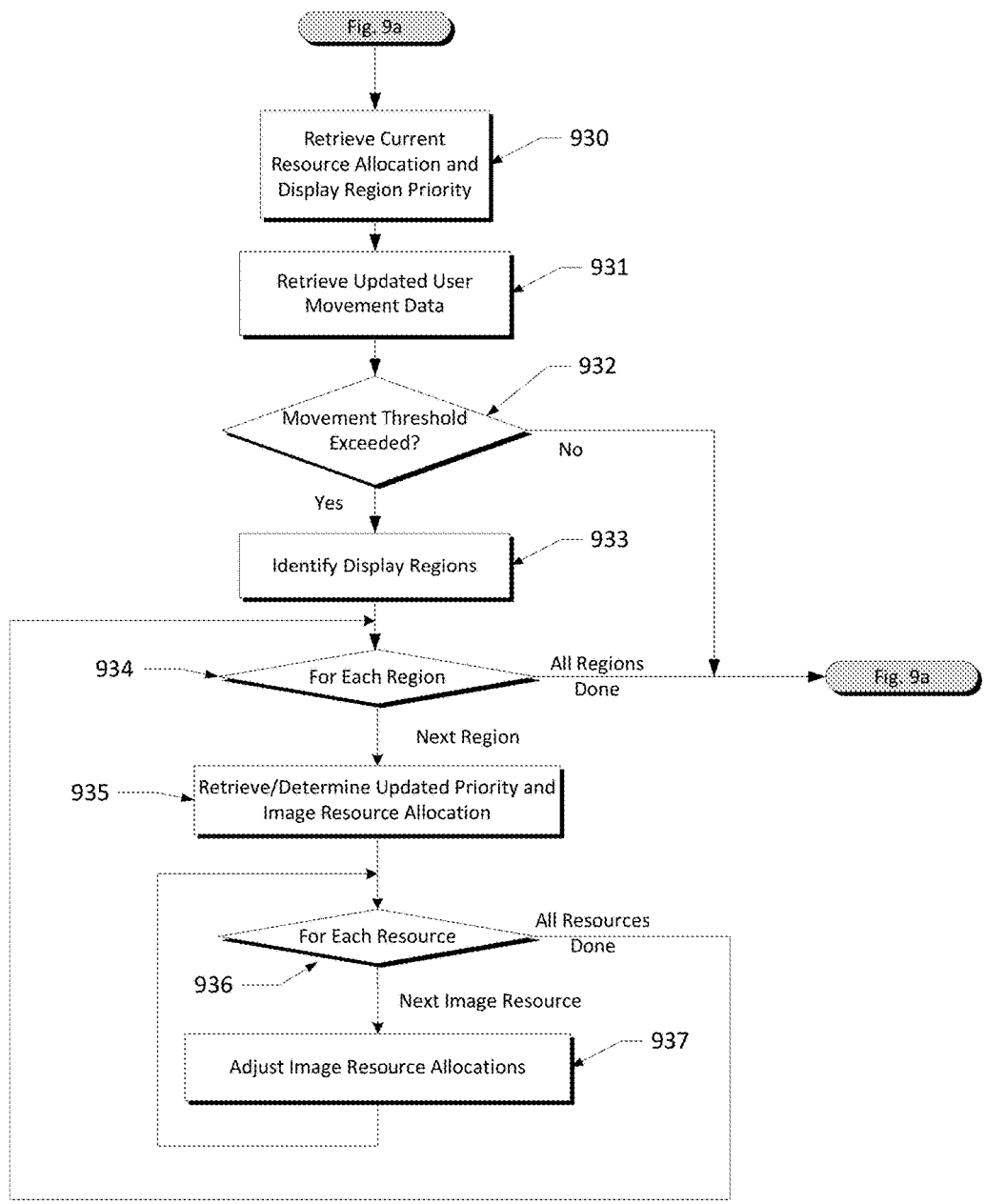
FIG. 9*b* illustrates an exemplary flowchart of a method in accordance with one or more aspects of the present disclosure.

Referring to FIG. 9b, at step 930, the system may retrieve information relating to the current allocation of image resources for the content (e.g., video image) being displayed to one or more users. During step 930 the system may also retrieve information relating to the current priority (e.g., rankings) of the one or more display regions within the display area (e.g., display device). After retrieving information relating to the current display region priority and image resource allocation, the method may move to step 931. At step 931, the system may retrieve movement data for the one or more users within the viewing area. Such movement data may include location and distance data collected during step 922, and user eye focus data collected and stored during steps 926 and 928, respectively.

At step 932, the system may determine whether the detected change in location and/or eye focus for one or more users exceeds a predetermined threshold. In this example, if the system determines that a user's location or change in eye focus exceeds the predetermined threshold, the method may proceed to step 933, where the system may identify one or more display regions associated with the change in user eye focus exceeding the predetermined threshold during step 932. In some embodiments, a user may be provided with a preference option permitting the user to establish the one or more predetermined thresholds utilized by the system. In other embodiments, during step 933, the system may be configured to identify one or more display regions in accordance with triggers embedded within the transmitted content.

If the system determines that the user's location or change in eye focus does not exceed the predetermined threshold, the method may proceed to 938, where the system may transmit the content (e.g., output one or more images) for display within the display area (e.g., display device) in accordance with the adjusted allocation of image resources. In this example, since the user's location or change in eye focus did not exceed the predetermined threshold, the system may not adjust the allocation of image resources for the content being displayed within the display area (e.g., display device), and thus the system may display the content in accordance with the image resource allocation retrieved during step 930.

At step 934, the system may begin a loop that is performed for one or more of the display regions identified in step 933. In some embodiments the system may not perform step 933, and may begin a loop that is performed for the one or more display regions identified during step 902. In another embodiment, during step 934, the system may be configured to begin a loop that is performed for each display region identified during step 902.

In step 935, the system may retrieve updated image resource allocation and priority (e.g., ranking) data for the display region being analyzed. In step 936, the system may begin a loop for one or more image resources (e.g., image resolution, image transmission rate, etc.) identified at step 935. In step 937, the system may begin to adjust (e.g., increase or decrease) the image resource being analyzed at step 936 in accordance with the updated image resource allocation and priority data retrieved during step 935.

After one or more resources have been analyzed for a display region, the method may return to step 934 to continue the loop until all of the display regions identified at step 933 have been analyzed. After the identified regions have been analyzed, the method may proceed to step 938, where the system may transmit the content (e.g., output the one or more images) for display within the display area (e.g., the display device) in accordance with the adjusted image resource allocation. Referring to FIG. 9a, after step 938, the method may proceed to step 904, where the system may determine whether a content session is currently active or in progress. If yes, the method may proceed through each step as indicated above. If no, the method ends.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
determining, by a computing device, a first distance between a first user and a display device, wherein a display area, of the display device, comprises a plurality of regions;
receiving, by the computing device, content for display via the display device, wherein the content comprises at least:
video content; and
prioritization data for one or more frames of the video content, wherein the prioritization data prioritizes at least one region, of the plurality of regions, with respect to at least one other region of the plurality of regions;
determining that a change in eye focus of the first user exceeds a second distance threshold within the display area of the display device;
determining, based at least in part on the first distance, the prioritization data, and the change in eye focus exceeding the second distance threshold, an image resource allocation for displaying an image within the display area; and
outputting, via the display device, the image for display within the display area in accordance with the determined image resource allocation.

2. The method of claim 1, further comprising:
determining one or more images in the content to be visually emphasized to the first user.

3. The method of claim 1, further comprising:
determining, based at least in part on data obtained from one or more triggers embedded in the content, a prioritization of image characteristics for one or more regions of the plurality of regions, of the display area.

4. The method of claim 1, further comprising:
determining a plurality of users, including the first user, within a threshold distance to the display area, and
determining one or more distances between the display area of the display device and the plurality of users.

5. The method of claim 4, wherein the image resource allocation is determined based at least in part on a distance corresponding to a user, of the plurality of users, that is within a shortest distance to the display device.

6. The method of claim 1, wherein the one or more frames of the video content comprise one or more of an I-Frame, a P-Frame, or a B-Frame.

7. The method of claim 4, further comprising:
determining a second user, of the plurality of users, that is closest to a remote control device; and
adjusting, based on a distance of the second user, the image resource allocation for displaying the image within the display area.

8. A method comprising:
receiving, by a computing device, content for display via a display device, wherein the content comprises at least:
video content; and
prioritization data for one or more frames of the video content, wherein the prioritization data prioritizes an image characteristic for at least one region with respect to at least one other region of a display area of the display device;
receiving information indicating a first distance of a first user from the display area;
determining a plurality of regions of the display area;
determining that a change in eye focus of the first user exceeds a second distance threshold within the display area of the display device;
determining, based at least in part on the first distance, the prioritization data, and the change in eye focus exceeding the second distance threshold, an image resource allocation for displaying an image within the display area; and
outputting, via the display device and based on the determined image resource allocation, the image for display within the display area.

9. The method of claim 8, further comprising:
determining that the first distance of the first user satisfies a threshold distance; and
adjusting, based on the determining that the first distance of the first user satisfies the threshold distance, a first image resolution for displaying the image in a first region of the display area.

10. The method of claim 8, further comprising:
processing, by the computing device, coordinate information indicating one or more regions, of the plurality of regions, of the display area to be visually emphasized to the first user.

11. The method of claim 8, further comprising:
determining, based at least in part on the first distance and one or more triggers embedded in the received content, a first image resolution for displaying the image in a first region of the display area;
receiving, by the computing device, information indicating a second region, of the plurality of regions, of the display area; and
determining a second image resolution for displaying the image in the second region, wherein the first image resolution is higher than the second image resolution.

12. The method of claim 8, further comprising:
determining, based at least in part on the first distance and one or more triggers embedded in the received content, a first image resolution for displaying the image in a first region, of the plurality of regions, of the display area; and
adjusting the first image resolution for displaying the image in the first region in accordance with information stored in a user profile.

13. The method of claim 8, further comprising:
based on to the determining that the change in the eye focus exceeds the second distance threshold, determining, based in part on the image characteristic, a ranking associated with the plurality of regions of the display area; and modifying the image resource allocation for displaying the image within the display area in accordance with the ranking associated with the plurality of regions of the display area.

14. The method of claim 8, further comprising:
determining one or more of a minimum resource threshold or a maximum resource threshold for adjusting a first image characteristic; and
adjusting, based on another distance of the first user from the display area, one or more of the minimum resource threshold and the maximum resource threshold.

15. The method of claim 8, further comprising:
determining one or more of a minimum resource threshold or a maximum resource threshold for adjusting a first image characteristic; and
adjusting, based on an amount of transmission resources available for outputting the image for display, one or more of the minimum resource threshold and the maximum resource threshold.

16. A method comprising:
outputting, via a display device, content for display;
determining, by a computing device, a plurality of regions of a display area of the display device;
determining, based on a distance between a first user and the display device, a sequence of image characteristics for adjusting an allocation of image resources;
determining a ranking associated with the plurality of regions based on an eye focus of the first user and at least a first image characteristic for displaying an image within the display area;
determining, based at least in part on the ranking and the sequence of image characteristics, an image resource allocation for displaying the image within the display area; and
outputting, via the display device, the image for display within the display area in accordance with the determined image resource allocation.

17. The method of claim 16, further comprising:
detecting an increase in transmission resources available for outputting the image for display within the display area; and
adjusting, based on the increase in transmission resources, a size of at least a first region, of the plurality of regions, of the display area associated with the eye focus of the first user.

18. The method of claim 16, wherein the image resource allocation is further determined based in part on one or more distances of a plurality of users, wherein the plurality of users comprises at least the first user.

19. The method of claim 16, further comprising:
adjusting, based on a new eye focus of the first user, the determined ranking; and
determining, by the computing device and based at least in part on the adjusted ranking, an updated image resource allocation for displaying the image.

20. The method of claim 16, wherein the first image characteristic comprises one or more of a rate of image adjustment, a degree of image compression, a level of image resolution, a frame rate, a level of texture resolution, or a processing power per pixel.

21. The method of claim 16, further comprising:
determining an availability of a transmission resource;
adjusting, based on the determined availability of the transmission resource, a size of a first region of the plurality of regions of the display area;
determining an updated image resource allocation for displaying the image within at least the first region of the display area; and
outputting, via the display device, the image for display within at least the first region of the display area in accordance with the updated image resource allocation.

* * * * *

UNITED STATES PATENT AND TRADEMARK OFFICE
CERTIFICATE OF CORRECTION

PATENT NO. : 10,264,211 B2  
APPLICATION NO. : 14/212681  
DATED : April 16, 2019  
INVENTOR(S) : Leech et al.

Page 1 of 1

It is certified that error appears in the above-identified patent and that said Letters Patent is hereby corrected as shown below:

On the Title Page

Item (72) Inventors, Line 4:  
Please delete "Highland" and insert --Highlands--

In the Specification

Column 11, Detailed Description, Line 35:  
Please delete "704," and insert --702,--

Column 14, Detailed Description, Line 38:  
Please delete "616" and insert --316--

In the Claims

Column 38, Claim 13, Line 63:  
After "based on", delete "to"

Signed and Sealed this  
Twenty-fourth Day of May, 2022

Katherine Kelly Vidal  
*Director of the United States Patent and Trademark Office*